(12) United States Patent
Majumdar et al.

(10) Patent No.: US 7,427,441 B2
(45) Date of Patent: Sep. 23, 2008

(54) TRANSPARENT POLYMERIC COATED CONDUCTOR

(76) Inventors: Debasis Majumdar, Eastman Kodak Company, 343 State St., Rochester, NY (US) 14650; Glen C. Irvin, Jr., Eastman Kodak Company, 343 State St., Rochester, NY (US) 14650; Charles C. Anderson, Eastman Kodak Company, 343 State St., Rochester, NY (US) 14650; Gary S. Freedman, Eastman Kodak Company, 343 State St., Rochester, NY (US) 14650

( * ) Notice: Subject to any disclaimer, the term of this patent is extended or adjusted under 35 U.S.C. 154(b) by 535 days.

(21) Appl. No.: 10/944,570

(22) Filed: Sep. 17, 2004

(65) Prior Publication Data

US 2006/0062975 A1 Mar. 23, 2006

(51) Int. Cl.
*B32B 27/00* (2006.01)
*B32B 37/00* (2006.01)
*H01L 51/00* (2006.01)
*H01B 1/12* (2006.01)

(52) U.S. Cl. .................. 428/419; 428/1.1; 428/690; 428/917; 252/500; 257/40; 257/E51.03; 313/503; 313/506; 349/140; 156/230; 156/234; 156/241

(58) Field of Classification Search .............. None
See application file for complete search history.

(56) References Cited

U.S. PATENT DOCUMENTS 4,070,189 A    1/1978 Kelley et al.

(Continued)

FOREIGN PATENT DOCUMENTS

EP    0 440 957    3/1996

(Continued)

OTHER PUBLICATIONS

Research Disclosure No. 41548, *Research Disclosure*, Nov. 1998, p. 1473, Kenneth Mason Publications Ltd., Hampshire, England.
*Synthetic Metals*, vol. 142 (2004), pp. 187-193, B. D. Martin et al.

*Primary Examiner*—Marie R. Yamnitzky
(74) *Attorney, Agent, or Firm*—Andrew J. Anderson

(57) ABSTRACT

A member comprising a substrate and a transparent conductive layer comprising a composition including an electronically conductive polymer of a polythiophene present in a cationic form with a polyanion, wherein the composition of the conductive layer has an FOM less than or equal to 50 wherein FOM is defined as the slope of a best fit straight line passing through the origin of the plot of ln (1/T) versus [1/SER] for said composition: and wherein T=visual light transmission: SER=surface electrical resistance in ohm per square; FOM=figure of merit, and wherein the SER of the conductive layer has a value of less than or equal to 1000 ohm per square. A display device, comprising a substrate and a conductive layer and a lead electrically connected to the conductive layer, wherein the conductive layer comprises a composition including an electronically conductive polymer of a polythiophene present in a cationic form with a polyanion wherein the composition of the conductive layer has an FOM less than or equal to 50 wherein FOM is defined as above, and wherein the SER of the conductive layer has a value of less than or equal to 1000 ohm per square.

29 Claims, 6 Drawing Sheets

U.S. PATENT DOCUMENTS

| | | | |
|---|---|---|---|
| 5,093,439 A | 3/1992 | Epstein et al. |
| 5,300,575 A | 4/1994 | Jonas et al. |
| 5,312,681 A | 5/1994 | Muys et al. |
| 5,354,613 A | 10/1994 | Quintens et al. |
| 5,370,981 A | 12/1994 | Krafft et al. |
| 5,372,924 A | 12/1994 | Quintens et al. |
| 5,391,472 A | 2/1995 | Muys et al. |
| 5,403,467 A | 4/1995 | Jonas et al. |
| 5,443,944 A | 8/1995 | Krafft et al. |
| 5,561,030 A | 10/1996 | Holdcroft et al. |
| 5,665,498 A | 9/1997 | Savage et al. |
| 5,674,654 A | 10/1997 | Zumbulyadis et al. |
| 5,716,550 A | 2/1998 | Gardner et al. |
| 5,738,934 A | 4/1998 | Jones |
| 5,766,515 A | 6/1998 | Jonas et al. |
| 5,828,432 A | 10/1998 | Shashidhar et al. |
| 5,959,708 A | 9/1999 | Lee et al. |
| 5,976,274 A | 11/1999 | Inoue et al. |
| 5,976,284 A | 11/1999 | Calvert et al. |
| 6,045,977 A | 4/2000 | Chandross et al. |
| 6,096,491 A | 8/2000 | Majumdar et al. |
| 6,124,083 A | 9/2000 | Majumdar et al. |
| 6,190,846 B1 | 2/2001 | Majumdar et al. |
| 6,404,120 B1 | 6/2002 | Aben et al. |
| 6,639,637 B2 | 10/2003 | Stephenson |
| 6,707,517 B2 | 3/2004 | Stephenson |
| 6,737,293 B2 | 5/2004 | Andriessen |
| 2002/0159127 A1 | 10/2002 | Wehrmann et al. |
| 2002/0172887 A1 | 11/2002 | Wolk et al. |
| 2003/0008135 A1 | 1/2003 | Kawamura et al. |
| 2003/0015691 A1 | 1/2003 | Haghighat et al. |
| 2003/0193042 A1 | 10/2003 | Go et al. |

FOREIGN PATENT DOCUMENTS

| | | |
|---|---|---|
| EP | 0 615 256 | 9/1998 |
| EP | 1 003 179 | 5/2000 |
| EP | 1 079 397 | 2/2001 |
| EP | 0 686 662 | 11/2002 |
| EP | 1 054 414 | 3/2003 |
| WO | WO 97/18944 | 5/1997 |
| WO | WO 00/39835 | 7/2000 |
| WO | WO 02/079316 | 10/2002 |

TRANSPARENT POLYMERIC COATED CONDUCTOR

FIELD OF THE INVENTION

The present invention relates to a member comprising a transparent polymer conductive layer on a substrate and the application of such member in electric devices particularly those suitable for display.

BACKGROUND OF THE INVENTION

Transparent electrically-conductive layers (TCL) of metal oxides such as indium tin oxide (ITO), antimony doped tin oxide, and cadmium stannate (cadmium tin oxide) are commonly used in the manufacture of electrooptical display devices such as liquid crystal display devices (LCDs), electroluminescent display devices, photocells, solid-state image sensors, electrochromic windows and the like.

Devices such as flat panel displays, typically contain a substrate provided with an indium tin oxide (ITO) layer as a transparent electrode. The coating of ITO is carried out by vacuum sputtering methods which involve high substrate temperature conditions up to 250° C., and therefore, glass substrates are generally used. The high cost of the fabrication methods and the low flexibility of such electrodes, due to the brittleness of the inorganic ITO layer as well as the glass substrate, limit the range of potential applications. As a result, there is a growing interest in making all-organic devices, comprising plastic resins as a flexible substrate and organic electroconductive polymer layers as an electrode. Such plastic electronics allow low cost devices with new properties. Flexible plastic substrates can be provided with an electroconductive polymer layer by continuous hopper or roller coating methods (compared to batch process such as sputtering) and the resulting organic electrodes enable the "roll to roll" fabrication of electronic devices which are more flexible, lower cost, and lower weight.

Electronically conductive polymers have recently received attention from various industries because of their electronic conductivity. Although many of these polymers are highly colored and are less suited for TCL applications, some of these electronically conductive polymers, such as substituted or unsubstituted pyrrole-containing polymers (as mentioned in U.S. Pat. Nos. 5,665,498 and 5,674,654), substituted or unsubstituted thiophene-containing polymers (as mentioned in U.S. Pat. Nos. 5,300,575, 5,312,681, 5,354,613, 5,370,981, 5,372,924, 5,391,472, 5,403,467, 5,443,944, 5,575,898, 4,987,042, and 4,731,408) and substituted or unsubstituted aniline-containing polymers (as mentioned in U.S. Pat. Nos. 5,716,550, 5,093,439, and 4,070,189) are transparent and not prohibitively colored, at least when coated in thin layers at moderate coverage. Because of their electronic conductivity these polymers can provide excellent process-surviving, humidity independent antistatic characteristics when coated on plastic substrates used for photographic imaging applications (vide, for example, U.S. Pat. Nos. 6,096,491; 6,124,083; 6,190,846;)

EP-A-440 957 describes a method for preparing polythiophene in an aqueous mixture by oxidative polymerization in the presence of a polyanion as a doping agent. In EP-A-686 662 it has been disclosed that highly conductive layers of polythiophene, coated from an aqueous coating solution, could be made by the addition of a di- or polyhydroxy and/or a carbonic acid, amide or lactam group containing compound in the coating solution of the polythiophene. Coated layers of organic electroconductive polymers can be patterned into electrode arrays using different methods. The known wet-etching microlithography technique is described in WO97/18944 and U.S. Pat. No. 5,976,274 wherein a positive or negative photoresist is applied on top of a coated layer of an organic electroconductive polymer, and after the steps of selectively exposing the photoresist to UV light, developing the photoresist, etching the electroconductive polymer layer and finally stripping the non-developed photoresist, a patterned layer is obtained. In U.S. Pat. No. 5,561,030 a similar method is used to form the pattern except that the pattern is formed in a continuous layer of prepolymer which is not yet conductive and that after washing the mask away the remaining prepolymer is rendered conductive by oxidation. Such methods that involve conventional lithographic techniques are cumbersome as they involve many steps and require the use of hazardous chemicals.

EP-A-615 256 describes a method to produce a pattern of a conductive polymer on a substrate that involves coating and drying a composition containing 3,4-ethylenedioxythiophene monomer, an oxidation agent, and a base; exposing the dried layer to UV radiation through a mask; and then heating. The UV exposed areas of the coating comprise nonconductive polymer and the unexposed areas comprise conductive polymer. The formation of a conductive polymer pattern in accordance with this method does not require the coating and patterning of a separate photoresist layer.

U.S. Pat. No. 6,045,977 describes a process for patterning conductive polyaniline layers containing a photobase generator. UV exposure of such layers produces a base that reduces the conductivity in the exposed areas.

EP-A-1 054 414 describes a method to pattern a conductive polymer layer by printing an electrode pattern onto said conductive polymer layer using a printing solution containing an oxidant selected from the group $ClO^-$, $BrO^-$, $MnO_4^-$, $Cr_2O_7^{-2}$, $S_2O_8^{-2}$, and $H_2O_2$. The areas of the conductive layer exposed to the oxidant solution are rendered nonconductive.

Research Disclosure, November 1998, page 1473 (disclosure no. 41548) describes various means to form patterns in conducting polymer, including photoablation wherein the selected areas are removed from the substrate by laser irradiation. Such photoablation processes are convenient, dry, one-step methods but the generation of debris may require a wet cleaning step and may contaminate the optics and mechanics of the laser device. Prior art methods involving removal of the electroconductive polymer to form the electrode pattern also induce a difference of the optical density between electroconductive and non-conductive areas of the patterned surface, which should be avoided.

Methods of patterning organic electroconductive polymer layers by image-wise heating by means of a laser have been disclosed in EP 1 079 397 A1. That method induces about a 10 to 1000 fold decrease in resistivity without substantially ablating or destroying the layer.

The application of electronically conductive polymers in display related devices has been envisioned in the past. European Patent Application EP9910201 describes a light transmissive substrate having a light transmissive conductive polymer coating for use in resistive touch screens. U.S. Pat. No. 5,738,934 describes touch screen cover sheets having a conductive polymer coating.

U.S. Pat. Nos. 5,828,432 and 5,976,284 describe conductive polymer layers employed in liquid crystal display devices. The example conductive layers are highly conductive but typically have transparency of 60% or less.

Use of polythiophene as transparent field spreading layers in displays comprising polymer dispersed liquid crystals has been disclosed in U.S. Pat. Nos. 6,639,637 and 6,707,517. However, the polythiophene layers in these patents are non-conductive in nature.

Use of commercial polythiophene coated sheet such as Orgacon from Agfa has been suggested for manufacturing of thin film inorganic light emitting diode has been suggested in U.S. Pat. No. 6,737,293. However, as discussed later, the transparency vs. surface electrical resistivity of such products may not be sufficient for some applications.

Use of conductive high molecular film for preventing the fringe field in the in-plane switching mode in liquid crystal display has been proposed in U.S. Pat. No. 5,959,708. However, the conductivity requirement for these films appears to be not very stringent. For example, in one embodiment (col. 5, lines 6-10) the high molecular film can be totally non-conductive. Moreover, U.S. Pat. No. 5,959,708 does not refer to any specification involving transmission characteristics of these films.

Use of transparent coating on glass substrates for cathode ray tubes using polythiophene and silicon oxide composites has been disclosed in U.S. Pat. No. 6,404,120. However, the method suggests in-situ polymerization of an ethylenedioxythiohene monomer on glass, baking it at an elevated temperature and subsequent washing with tetra ethyl orthosilicate. Such an involved process may be difficult to practice for roll-to-roll production of a wide flexible plastic substrate.

Use of in-situ polymerized polythiophene and polypyrrole has been proposed in U.S. patent application Pub. 2003/0008135 A1 as conductive films, for ITO replacement. As mentioned earlier, such processes are difficult to implement for roll-to-roll production of conductive coatings. In the same patent application, a comparative example was created using a dispersion of poly(3,4ethylene dioxythiophene)/polystyrene sulfonic acid which resulted in inferior coating properties.

Addition of conductivity enhancing agents such as organic compounds with dihydroxy or polyhydroxy and/or carboxyl groups or amide groups or lactam groups are suggested for incorporation in polythiophene in U.S. Pat. No. 5,766,515. Recently, U.S. patent application Pub. 2003/0193042 A1 claims further improvement in conductivity of polythiophene through the addition of a substantial quantity of organic compounds such as phenols. But, health and safety concerns will dictate special precautionary measures, which may need to be taken, for the introduction of such hazardous compounds to a typical web manufacturing and coating site, thus possibly adding cost to the final product.

In another recent publication titled "Hydroxylated secondary dopants for surface resistance enhancement in transparent poly(3,4-ethylenedioxythiophene)-poly(styrenesulfonate) thin films" by B. D. Martin, N. Nikolov, S. K. Pollack, A. Saprigin, R. Shashidhar, F. Zhang and P. A. Heiney, published in Synthetic Metals, vol. 142 (2004), p. 187-193, it was stated that the addition of small hydroxylated secondary dopants could greatly decrease the surface resistance of polythiophene films without reducing film transparency. However, as will be demonstrated later, the surface electrical resistance and transparency of the films quoted in this paper are not at par with the present invention.

As indicated herein above, the art discloses a wide variety of electrically conductive TCL compositions that can be incorporated in displays. Although application of electronically conductive polymers in display related devices has been contemplated in the past, the stringent requirement of high transparency and low surface electrical resistivity demanded by modern display devices is extremely difficult to attain with electronically conductive polymers Thus, there is still a critical need in the art for electronically conductive polymers that can be coated roll-to-roll on a wide variety of substrates under typical manufacturing conditions using environmentally desirable components. In addition to providing superior electrode performance, the TCL layers also must be highly transparent, must be patternable, must resist the effects of humidity change, and be manufacturable at a reasonable cost.

It is toward the objective of providing such improved electrically conductive, highly transparent web coatable, TCL films that more effectively meet the diverse commercial needs than those of the prior art that the present invention is directed.

SUMMARY OF THE INVENTION

The present invention provides a member comprising a substrate and a transparent conductive layer comprising an electronically conductive polymer of a polythiophene present in a cationic form with a polyanion wherein said conductive layer-has an FOM less than or equal to 50 wherein FOM is defined as the slope of the plot of ln (1/T) versus [1/SER]: and wherein T=visual light transmission
SER=surface electrical resistance in ohm per square
FOM=figure of merit, and wherein the SER has a value of less than or equal to 1000 ohm per square.

The present invention further provides a display device, comprising a substrate and a conductive layer and a lead electrically connected to said conductive layer, wherein said conductive layer comprises an electronically conductive polymer of a polythiophene present in a cationic form with a polyanion wherein said conductive layer has an FOM less than or equal to 50 wherein FOM is defined as the slope of the plot of ln (1/T) versus [1/SER]: and wherein T=visual light transmission
SER=surface electrical resistance in ohm per square
FOM=figure of merit, and wherein the SER has a value of less than or equal to 1000 ohm per square.

DETAILED DESCRIPTION OF THE INVENTION

Figure 1:
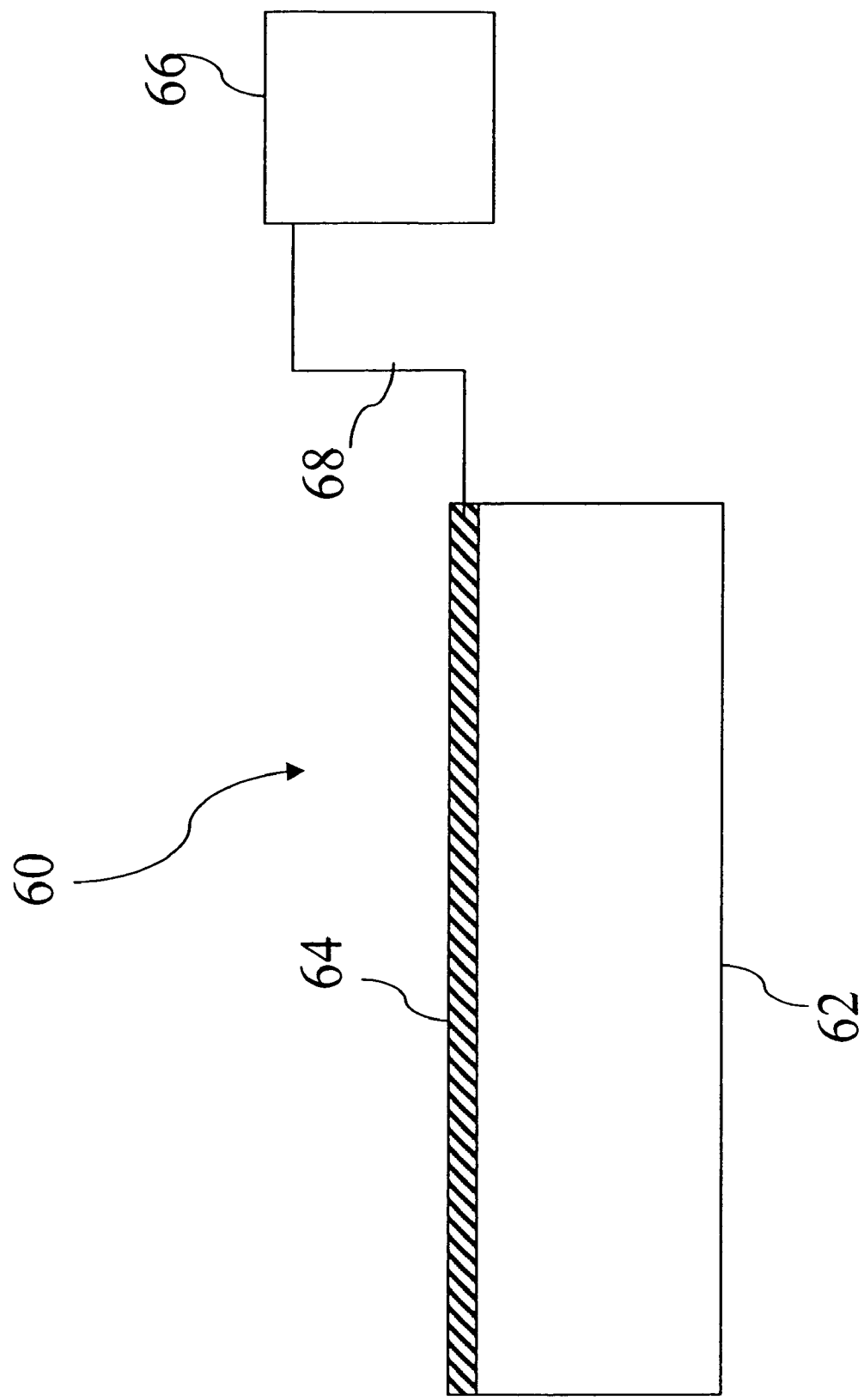
FIG. 1. A schematic of a display component comprising a substrate, and an electronically conductive polymer layer connected to a power source by an electric lead, as per the invention.

The transparent conductive layer of the invention comprises an electronically conductive polymer of a polythiophene present in a cationic form with a polyanion. Such electronically conductive polymers may be soluble or dispersible in organic solvents or water or mixtures thereof. For environmental reasons, aqueous compositions are preferred. A preferred electronically conductive polymer comprises 3,4-dialkoxy substituted polythiophene styrene sulfonate because of its relatively neutral color. The most preferred electronically conductive polymers include poly(3,4-ethylene dioxythiophene styrene sulfonate) which comprises poly (3,4-ethylene dioxythiophene) in a cationic form with polystyrenesulfonic acid. The advantage of choosing the aforementioned polymers arise from the fact that that they are primarily water based, stable polymer structure to light and heat, stable dispersions and cause minimum concern for storage, health, environmental and handling.

Preparation of the aforementioned polythiophene based polymers has been discussed in detail in a publication titled "Poly(3,4-ethylenedioxythiophene) and its derivatives: past, present and future" by L. B. Groenendaal, F. Jonas, D. Freitag, H. Pielartzik and J. R. Reynolds in Advanced Materials, (2000), 12, No. 7, pp. 481-494, and references therein.

The conductive layer of the invention should contain about 1 to about 1000 mg/m² dry coating weight of the electronically conductive polymer. Preferably, the conductive layer should contain about 5 to about 500 mg/m² dry coating weight of the electronically conductive polymer. The actual dry coating weight of the conductive polymer applied is determined by the properties of the particular conductive polymer employed and by the requirements of the particular application. These requirements include conductivity, transparency, optical density and cost for the layer.

In a preferred embodiment, the layer containing the electronically conductive polymer is prepared by applying a mixture comprising:

a) a polythiophene according to Formula I

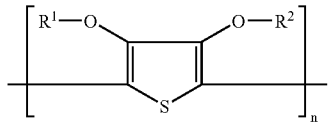

in a cationic form, wherein each of R1 and R2 independently represents hydrogen or a C1-4 alkyl group or together represent an optionally substituted C1-4 alkylene group or a cycloalkylene group, preferably an ethylene group, an optionally alkyl-substituted methylene group, an optionally C1-12 alkyl- or phenyl-substituted 1,2-ethylene group, a 1,3-propylene group or a 1,2-cyclohexylene group; and n is 3 to 1000;

and b) a polyanion compound;

It is preferred that the electronically conductive polymer and polyanion combination is soluble or dispersible in organic solvents or water or mixtures thereof. For environmental reasons, aqueous systems are preferred. Polyanions used with these electronically conductive polymers include the anions of polymeric carboxylic acids such as polyacrylic acids, poly(methacrylic acid), and poly(maleic acid), and polymeric sulfonic acids such as polystyrenesulfonic acids and polyvinylsulfonic acids, the polymeric sulfonic acids being preferred for use in this invention because it is widely available and water coatable. These polycarboxylic and polysulfonic acids may also be copolymers formed from vinylcarboxylic and vinylsulfonic acid monomers copolymerized with other polymerizable monomers such as the esters of acrylic acid and styrene. The molecular weight of the polyacids providing the polyanions preferably is 1,000 to 2,000,000 and more preferably 2,000 to 500,000. The polyacids or their alkali salts are commonly available, for example as polystyrenesulfonic acids and polyacrylic acids, or they may be produced using known methods. Instead of the free acids required for the formation of the electrically conducting polymers and polyanions, mixtures of alkali salts of polyacids and appropriate amounts of monoacids may also be used. The polythiophene to polyanion weight ratio can widely vary between 1:99 to 99:1, however, optimum properties such as high electrical conductivity and dispersion stability and coatability are obtained between 85:15 and 15:85, and more preferably between 50:50 and 15:85. The most preferred electronically conductive polymers include poly(3,4-ethylene dioxythiophene styrene sulfonate) which comprises poly(3, 4-ethylene dioxythiophene) in a cationic form and polystyrenesulfonic acid.

Desirable results such as enhanced conductivity of the polythiophene layer can be accomplished by incorporating a conductivity enhancing agent (CEA). Preferred CEAs are organic compounds containing dihydroxy, poly-hydroxy, carboxyl, amide, or lactam groups, such as (1) those represented by the following Formula II:

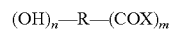

wherein m and n are independently an integer of from 1 to 20, R is an alkylene group having 2 to 20 carbon atoms, an arylene group having 6 to 14 carbon atoms in the arylene chain, a pyran group, or a furan group, and X is —OH or —NYZ, wherein Y and Z are independently hydrogen or an alkyl group; or (2) a sugar, sugar derivative, polyalkylene glycol, or glycerol compound; or (3) those selected from the group consisting of N-methylpyrrolidone, pyrrolidone, caprolactam, N-methyl caprolactam, dimethyl sulfoxide or N-octylpyrrolidone; or (4) a combination of the above.

Particularly preferred conductivity enhancing agents are: sugar and sugar derivatives such as sucrose, glucose, fructose, lactose; sugar alcohols such as sorbitol, mannitol; furan derivatives such as 2-furancarboxylic acid, 3-furancarboxylic acid and alcohols. Ethylene glycol, glycerol, di- or triethylene glycol are most preferred because they provide the maximum conductivity enhancement.

The CEA can be incorporated by any suitable method. Preferably the CEA is added to the coating composition comprising the polythiophene. Alternatively, the coated polythiophene containing layer can be exposed to the CEA by any suitable method, such as post-coating wash.

The concentration of the CEA in the coating composition may vary widely depending on the particular organic compound used and the conductivity requirements. However, convenient concentrations that may be effectively employed in the practice of the present invention are about 0.5 to about 25 weight %; more conveniently 0.5 to 10 and more desirably 0.5 to 5 as it is the minimum effective amount.

While the electronically conductive polymer can be applied without the addition of a film-forming polymeric binder, a film-forming binder can be employed to improve the physical properties of the layer. In such an embodiment, the layer may comprise from about 1 to 95% of the film-forming polymeric binder. However, the presence of the film forming binder may increase the overall surface electrical resistivity of the layer. The optimum weight percent of the film-forming polymer binder varies depending on the electrical properties of the electronically conductive polymer, the chemical composition of the polymeric binder, and the requirements for the particular circuit application.

Polymeric film-forming binders useful in the conductive layer of this invention can include, but are not limited to, water-soluble or water-dispersible hydrophilic polymers such as gelatin, gelatin derivatives, maleic acid or maleic anhydride copolymers, polystyrene sulfonates, cellulose derivatives (such as carboxymethyl cellulose, hydroxyethyl cellulose, cellulose acetate butyrate, diacetyl cellulose, and triacetyl cellulose), polyethylene oxide, polyvinyl alcohol, and poly-N-vinylpyrrolidone. Other suitable binders include aqueous emulsions of addition-type homopolymers and copolymers prepared from ethylenically unsaturated monomers such as acrylates including acrylic acid, methacrylates including methacrylic acid, acrylamides and methacrylamides, itaconic acid and its half-esters and diesters, styrenes including substituted styrenes, acrylonitrile and methacrylonitrile, vinyl acetates, vinyl ethers, vinyl and vinylidene halides, and olefins and aqueous dispersions of polyurethanes and polyesterionomers.

Other ingredients that may be included in the layer containing the electronically conductive polymer include but are not limited to surfactants, defoamers or coating aids, charge control agents, thickeners or viscosity modifiers, antiblocking agents, coalescing aids, crosslinking agents or hardeners, soluble and/or solid particle dyes, matte beads, inorganic or polymeric particles, adhesion promoting agents, bite solvents or chemical etchants, lubricants, plasticizers, antioxidants, colorants or tints, and other addenda that are well-known in the art. Preferred bite solvents can include any of the volatile aromatic compounds disclosed in U.S. Pat. No. 5,709,984, as "conductivity-increasing" aromatic compounds, comprising an aromatic ring substituted with at least one hydroxy group or a hydroxy substituted substituents group. These compounds include phenol, 4-chloro-3-methyl phenol, 4-chlorophenol, 2-cyanophenol, 2,6-dichlorophenol, 2-ethylphenol, resorcinol, benzyl alcohol, 3-phenyl-1-propanol, 4-methoxyphenol, 1,2-catechol, 2,4-dihydroxytoluene, 4-chloro-2-methyl phenol, 2,4-dinitrophenol, 4-chlororesorcinol, 1-naphthol, 1,3-naphthalenediol and the like. These bite solvents are particularly suitable for polyester based polymer sheets of the invention. Of this group, the most preferred compounds are resorcinol and 4-chloro-3-methyl phenol. Preferred surfactants suitable for these coatings include nonionic and anionic surfactants. Preferred crosslinking agents suitable for these coatings include silane compounds such as those disclosed in U.S. Pat. No. 5,370,981.

The conductive layer of the invention can be formed on any rigid or flexible substrate. The substrates can be transparent, translucent or opaque, and may be colored or colorless. Rigid substrates can include glass, metal, ceramic and/or semiconductors. Flexible substrates, especially those comprising a plastic substrate, are preferred for their versatility and ease of manufacturing, coating and finishing.

The flexible plastic substrate can be any flexible self substrateing plastic film that substrates the conductive polymeric film. "Plastic" means a high polymer, usually made from polymeric synthetic resins, which may be combined with other ingredients, such as curatives, fillers, reinforcing agents, colorants, and plasticizers. Plastic includes thermoplastic materials and thermosetting materials.

The flexible plastic film must have sufficient thickness and mechanical integrity so as to be self-substrateing, yet should not be so thick as to be rigid. Another significant characteristic of the flexible plastic substrate material is its glass transition temperature (Tg). Tg is defined as the glass transition temperature at which plastic material will change from the glassy state to the rubbery state. It may comprise a range before the material may actually flow. Suitable materials for the flexible plastic substrate include thermoplastics of a relatively low glass transition temperature, for example up to 150° C., as well as materials of a higher glass transition temperature, for example, above 150° C. The choice of material for the flexible plastic substrate would depend on factors such as manufacturing process conditions, such as deposition temperature, and annealing temperature, as well as post-manufacturing conditions such as in a process line of a displays manufacturer. Certain of the plastic substrates discussed below can withstand higher processing temperatures of up to at least about 200° C., some up to 300°-350° C., without damage.

Typically, the flexible plastic substrate is a polyester including polyethylene terephthalate (PET), polyethylene naphthalate (PEN), polyester ionomer, polyethersulfone (PES), polycarbonate (PC), polysulfone, a phenolic resin, an epoxy resin, polyester, polyimide, polyetherester, polyetheramide, cellulose nitrate, cellulose acetate, poly(vinyl acetate), polystyrene, polyolefins including polyolefin ionomers, polyamide, aliphatic polyurethanes, polyacrylonitrile, polytetrafluoroethylenes, polyvinylidene fluorides, poly(methyl (x-methacrylates), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly(ether ether ketone) (PEEK), poly(ether ketone) (PEK), poly(ethylene tetrafluoroethylene)fluoropolymer (PETFE), and poly(methyl methacrylate) and various acrylate/methacrylate copolymers (PMMA) natural and synthetic paper, resin-coated or laminated paper, voided polymers including polymeric foam, microvoided polymers and microporous materials, or fabric, or any combinations thereof.

Aliphatic polyolefins may include high density polyethylene (HDPE), low density polyethylene (LDPE), and polypropylene, including oriented polypropylene (OPP). Cyclic polyolefins may include poly(bis(cyclopentadiene)). A preferred flexible plastic substrate is a cyclic polyolefin or a polyester. Various cyclic polyolefins are suitable for the flexible plastic substrate. Examples include Artong made by Japan Synthetic Rubber Co., Tokyo, Japan; Zeanor T made by Zeon Chemicals L.P., Tokyo Japan; and Topas® made by Celanese A. G., Kronberg Germany. Arton is a poly(bis(cyclopentadiene)) condensate that is a film of a polymer. Alternatively, the flexible plastic substrate can be a polyester. A preferred polyester is an aromatic polyester such as Arylite. Although the substrate can be transparent, translucent or opaque, for most display applications transparent members comprising transparent substrate(s) are preferred. Although various examples of plastic substrates are set forth above, it should be appreciated that the flexible substrate can also be formed from other materials such as flexible glass and ceramic.

The flexible plastic substrate can be reinforced with a hard coating. Typically, the hard coating is an acrylic coating. Such a hard coating typically has a thickness of from 1 to 15 microns, preferably from 2 to 4 microns and can be provided by free radical polymerization, initiated either thermally or by ultraviolet radiation, of an appropriate polymerizable material. Depending on the substrate, different hard coatings can be used. When the substrate is polyester or Arton, a particularly preferred hard coating is the coating known as "Lintec." Lintec contains UV cured polyester acrylate and colloidal silica. When deposited on Arton, it has a surface composition of 35 atom % C, 45 atom % O, and 20 atom % Si, excluding hydrogen. Another particularly preferred hard coating is the acrylic coating sold under the trademark "Terrapin" by Tekra Corporation, New Berlin, Wis.

The most preferred flexible plastic substrate is a polyester because of its superior mechanical and thermal properties as well as its availability in large quantity at a moderate price. The particular polyester chosen for use can be a homo-polyester or a co-polyester, or mixtures thereof as desired. The polyester can be crystalline or amorphous or mixtures thereof as desired. Polyesters are normally prepared by the condensation of an organic dicarboxylic acid and an organic diol and, therefore, illustrative examples of useful polyesters will be described herein below in terms of these diol and dicarboxylic acid precursors.

Polyesters which are suitable for use in this invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters. Exemplary of useful cycloaliphatic, aliphatic and aromatic polyesters which can be utilized in the practice of their invention are poly(ethylene terephthalate), poly(cyclohexlenedimethylene), terephthalate) poly(ethylene dodecate), poly(butylene terephthalate), poly(ethylene naphthalate), poly(ethylene(2, 7-naphthalate)), poly(methaphenylene isophthalate), poly(g-lycolic acid), poly(ethylene succinate), poly(ethylene adipate), poly(ethylene sebacate), poly(decamethylene azelate), poly(ethylene sebacate), poly(decamethylene adipate), poly(decamethylene sebacate), poly(dimethylpropiolactone), poly(para-hydroxybenzoate) (Ekonol), poly(ethylene oxybenzoate) (A-tell), poly(ethylene isophthalate), poly(tetramethylene terephthalate, poly(hexamethylene terephthalate), poly(decamethylene terephthalate), poly(1,4-cyclohexane dimethylene terephthalate) (trans), poly(ethylene 1,5-naphthalate), poly(ethylene 2,6-naphthalate), poly(1,4-cyclohexylene dimethylene terephthalate), (Kodel) (cis), and poly(1,4-cyclohexylene dimethylene terephthalate (Kodel) (trans). Polyester compounds prepared from the condensation of a diol and an aromatic dicarboxylic acid is preferred for use in this invention. Illustrative of such useful aromatic carboxylic acids are terephthalic acid, isophthalic acid and an α-phthalic acid, 1,3-napthalenedicarboxylic acid, 1,4 napthalenedicarboxylic acid, 2,6-napthalenedicarboxylic acid, 2,7-napthalenedicarboxylic acid, 4,4'-diphenyldicarboxylic acid, 4,4'-diphenysulfphone-dicarboxylic acid, 1,1,3-trimethyl-5-carboxy-3-(p-carboxyphenyl)-idane, diphenyl ether 4,4'-dicarboxylic acid, bis-p(carboxy-phenyl)methane, and the like. Of the aforementioned aromatic dicarboxylic acids, those based on a benzene ring (such as terephthalic acid, isophthalic acid, orthophthalic acid) are preferred for use in the practice of this invention. Amongst these preferred acid precursors, terephthalic acid is particularly preferred acid precursor.

Preferred polyesters for use in the practice of this invention include poly(ethylene terephthalate), poly(butylene terephthalate), poly(1,4-cyclohexylene dimethylene terephthalate) and poly(ethylene naphthalate) and copolymers and/or mixtures thereof. Among these polyesters of choice, poly(ethylene terephthalate) is most preferred.

The aforesaid substrate useful for application in display devices can be planar and/or curved. The curvature of the substrate can be characterized by a radius of curvature, which may have any value. Alternatively, the substrate may be bent so as to form an angle. This angle may be any angle from 0° to 360°, including all angles therebetween and all ranges therebetween. If the substrate is electrically conducting, an insulating material such as a non-conductive polymer may be placed between the substrate and the conducting polymer.

The substrate may be of any thickness, such as, for example. $10^{-8}$ cm to 1 cm including all values in between and all ranges therebetween. Thicker and thinner layers may be used. The substrate need not have a uniform thickness. The preferred shape is square or rectangular, although any shape may be used. Before the substrate is coated with the conducting polymer it may be physically and/or optically patterned, for example by rubbing, by the application of an image, by the application of patterned electrical contact areas, by the presence of one or more colors in distinct regions, by embossing, microembossing, microreplication, etc.

The aforesaid substrate can comprise a single layer or multiple layers according to need. The multiplicity of layers may include any number of auxiliary layers such as antistatic layers, tie layers or adhesion promoting layers, abrasion resistant layers, curl control layers, conveyance layers, barrier layers, splice providing layers, UV absorption layers, optical effect providing layers, such as antireflective and antiglare layers, waterproofing layers, adhesive layers, imaging layers and the like.

The polymer substrate can be formed by any method known in the art such as those involving extrusion, coextrusion, quenching, orientation, heat setting, lamination, coating and solvent casting. It is preferred that the polymer substrate is an oriented sheet formed by any suitable method known in the art, such as by a flat sheet process or a bubble or tubular process. The flat sheet process involves extruding or coextruding the materials of the sheet through a slit die and rapidly quenching the extruded or coextruded web upon a chilled casting drum so that the polymeric component(s) of the sheet are quenched below their solidification temperature.

The quenched sheet is then biaxially oriented by stretching in mutually perpendicular directions at a temperature above the glass transition temperature of the polymer(s). The sheet may be stretched in one direction and then in a second direction or may be simultaneously stretched in both directions. The preferred stretch ratio in any direction is at least 3:1. After the sheet has been stretched, it is heat set by heating to a temperature sufficient to crystallize the polymers while restraining to some degree the sheet against retraction in both directions of stretching.

The polymer sheet may be subjected to any number of coatings and treatments, after extrusion, coextrusion, orientation, etc. or between casting and full orientation, to improve its properties, such as printability, barrier properties, heat-sealability, spliceability, adhesion to other substrates and/or imaging layers. Examples of such coatings can be acrylic coatings for printability, polyvinylidene halide for heat seal properties, etc. Examples of such treatments can be flame, plasma and corona discharge treatment, ultraviolet radiation treatment, ozone treatment and electron beam treatment to improve coatability and adhesion. Further examples of treatments can be calendaring, embossing and patterning to obtain specific effects on the surface of the web. The polymer sheet can be further incorporated in any other suitable substrate by lamination, adhesion, cold or heat sealing, extrusion coating, or any other method known in the art.

The conductive layer of the invention can be formed by any method known in the art. Particularly preferred methods include coating from a suitable coating composition by any well known coating method such as air knife coating, gravure coating, hopper coating, roller coating, spray coating, electrochemical coating, inkjet printing, flexographic printing, and the like. Altlernatively, the conductive layer can be transferred to a receiver member from a donor member by the application of heat and/or pressure. An adhesive layer may be preferably present between the conductive layer and the receiver member.

Another preferred method of forming the conductive layer is by thermal transfer as disclosed in a series of U.S. patents and patent applications, e.g., U.S. Pat Nos. 6,114,088; 6,140,009; 6,214,520; 6,221,553; 6,582,876; 6,586,153 by Wolk et al.; U.S. Pat. Nos. 6,610,455; 6,582,875; 6,252,621; 2004/0029039 A1; by Tutt et al., U.S. Pat. No. 5,171,650 by Ellis et al.; 2004/0065970 A1 by Blanchet-Fincher. Accordingly, it is envisioned that a thermal transfer element comprising a donor substrate and a multicomponent transfer unit can be formed wherein the multicomponent transfer unit comprises the conductive layer of the invention. Such a transfer unit is fully or partially transferred through the application of heat onto a receiver substrate, thus incorporating the conductive layer of the invention on the receiver substrate.

Besides the conductive layer of the invention, the aforementioned thermal transfer element may comprise a number of other layers. These additional layers may include radiation absorption layer, which can be a light to heat conversion layer, interlayer, release layer, adhesion promoting layer, operational layer (which is used in the operation of a device), non-operational layer (which is not used in the operation of a device but can facilitate, for example, transfer of a transfer layer, protection from damage and/or contact with outside elements).

Thermal transfer of the layer of the invention can be accomplished by the application of directed heat on a selected portion of the thermal transfer element. Heat can be generated using a heating element (e.g., a resistive heating element), converting radiation (e.g., a beam of light) to heat, and/or applying an electrical current to a layer of thermal transfer element to generate heat.

For some specific display applications, such as those involving organic or polymeric light emitting diodes the roughness of the conductive layer can be critical. Typically, a very smooth surface, with low roughness (Ra) is desired for maximizing optical and barrier properties of the coated substrate. Preferred Ra values for the conductive layer of the invention is less than 1000 nm, more preferably less than 100 nm, and most preferably less than 20 nm. However, it is to be understood that if for some application a rougher surface is required higher Ra values can be attained within the scope of this invention, by any means known in the art.

A key criterion of the conductive layer of the invention involves two important characteristics of the conductive layer, namely its transparency and its surface electrical resistance. As alluded to herein above, the stringent requirement of high transparency and low SER demanded by modem display devices is extremely difficult to attain with electronically conductive polymers. Typically, lower surface electrical resistance values are obtained by coating relatively thick layers which undesirably reduces transparency. Additionally, even the same general class of conductive polymers, such as a polythiophene containing polymers, may result in different SER and transparency characteristics, based on differences in molecular weight, impurity content, doping level, morphology and the like.

It is found during the course of this invention that a figure of merit (FOM) can be assigned to the electronically conductive polymer layer. Such FOM values are determined by (1) measuring the visual light transmission (T) and the surface electrical resistance (SER) of the conductive layer at various thickness values of the layer, (2) plotting these data in a ln (1/T) vs. 1/SER space, and (3) then determining the slope of a straight line best fitting these data points and passing through the origin of such a plot. Without being bound to any particular theory, it is found that ln (1/T) vs. 1/SER plots for electronically conductive polymer layers, comprising polythiophene in a cationic form with a polyanion compound, generate a linear relationship, preferably one passing through the origin, wherein the slope of such a linear plot is the FOM of the electronically conductive polymer layer. Without being bound to any particular theory, it is also found that lower the FOM value, more desirable is the electrical and optical characteristics of the electronically conductive polymer layer; namely, lower the FOM, lower is the SER and higher is the transparency of the conductive layer. For the instant invention, FOM values of <100, preferably $\leq 50$, and more preferably $\leq 40$ is found to generate most desired results for display applications, Visual light transmission value T is determined from the total optical density at 530 nm, after correcting for the contributions of the uncoated substrate. A Model 361T X-Rite densitometer measuring total optical density at 530 nm, is best suited for this measurement.

Visual light transmission, T, is related to the corrected total optical density at 530 nm, o.d.(corrected), by the following expression, $$T = 1/(10^{o.d.(corected)})$$

The SER value is typically determined by a standard four-point electrical probe.

The SER value of the conductive layer of the invention can vary according to need. For use as an electrode in a display device, the SER is typically less than 10000 ohms/square, preferably less than 5000 ohms/square, and more preferably less than 1000 ohms/square and most preferably less than 500 ohms/square, as per the current invention.

The transparency of the conductive layer of the invention can vary according to need. For use as an electrode in a display device, the conductive layer is desired to be highly transparent. Accordingly, the visual light transmission value T for the conductive layer of the invention is >65%, preferably $\geq 70\%$, more preferably $\geq 80\%$, and most preferably $\geq 90\%$.

The conductive layer need not form an integral whole, need not have a uniform thickness and need not be contiguous with the base substrate.

In a particular embodiment of the invention the electronically conductive polymer layer may be formed into electrode or other array patterns. Useful patterning techniques include: inkjet printing, transfer printing such as lithoplate printing, various dry etching methods such as laser etching and thermal ablation, wet etching methods such as the microlithographic techniques described in WO97/18944 and U.S. Pat. No. 5,976,274, and others.

In one embodiment, the aforementioned substrate and the aforementioned electronically conductive polymer layer are incorporated as a transparent member in a display device. The display device typically comprises at least one imageable layer wherein the imageable layer can contain an electrically imageable material. The electrically imageable material can be light emitting or light modulating. Light emitting materials can be inorganic or organic in nature. Particularly preferred are organic light emitting diodes (OLED) or polymeric light emitting diodes (PLED). The light modulating material can be reflective or transmissive. Light modulating materials can be electrochemical, electrophoretic, such as Gyricon particles, electrochromic, or liquid crystals. The liquid crystalline material can be twisted nematic (TN), super-twisted nematic (STN), ferroelectric, magnetic, or chiral nematic liquid crystals. Especially preferred are chiral nematic liquid crystals. The chiral nematic liquid crystals can be polymer dispersed liquid crystals (PDLC). Structures having stacked imaging layers or multiple substrate layers, however, are optional for providing additional advantages in some case.

The present invention, comprising the aforementioned electronically conductive polymer layer may simply be substituted for any one or more conducting electrodes present in such prior art devices. The present invention preferably has at least one electric lead attached to (in contact with) the electronically conductive polymer layer on the substrate for the application of current, voltage, etc. to said conductive polymer (i.e. electrically connected). The lead(s) is/are preferably not in electrical contact with the substrate and may be made of patterned deposited metal, conductive or semiconductive material, such as ITO, may be a simple wire in contact with the conducting polymer, and/or conductive paint comprising, for example, a conductive polymer, carbon, and/or metal particles. Devices according to the invention preferably also include a current or a voltage source electrically connected to the conducting electrode through the lead(s). A power source, battery, etc. may be used. One embodiment of the invention is illustrated in FIG. 1 as a display component 60, wherein a substrate 62 is coated with an electronically conductive polymer layer 64, which is connected to a power source 66 by means of an electric lead 68.

In a preferred embodiment, the electrically imageable material can be addressed with an electric field and then retain its image after the electric field is removed, a property typically referred to as "bistable". Particularly suitable electrically imageable materials that exhibit "bistability" are electrochemical, electrophoretic, such as Gyricon particles, electrochromic, magnetic, or chiral nematic liquid crystals. Especially preferred are chiral nematic liquid crystals. The chiral nematic liquid crystals can be polymer dispersed liquid crystals (PDLC).

For purpose of illustration of the application of the present invention, the display will be described primarily as a liquid crystal display. However, it is envisioned that the present invention may find utility in a number of other display applications.

Display

Figure 2:
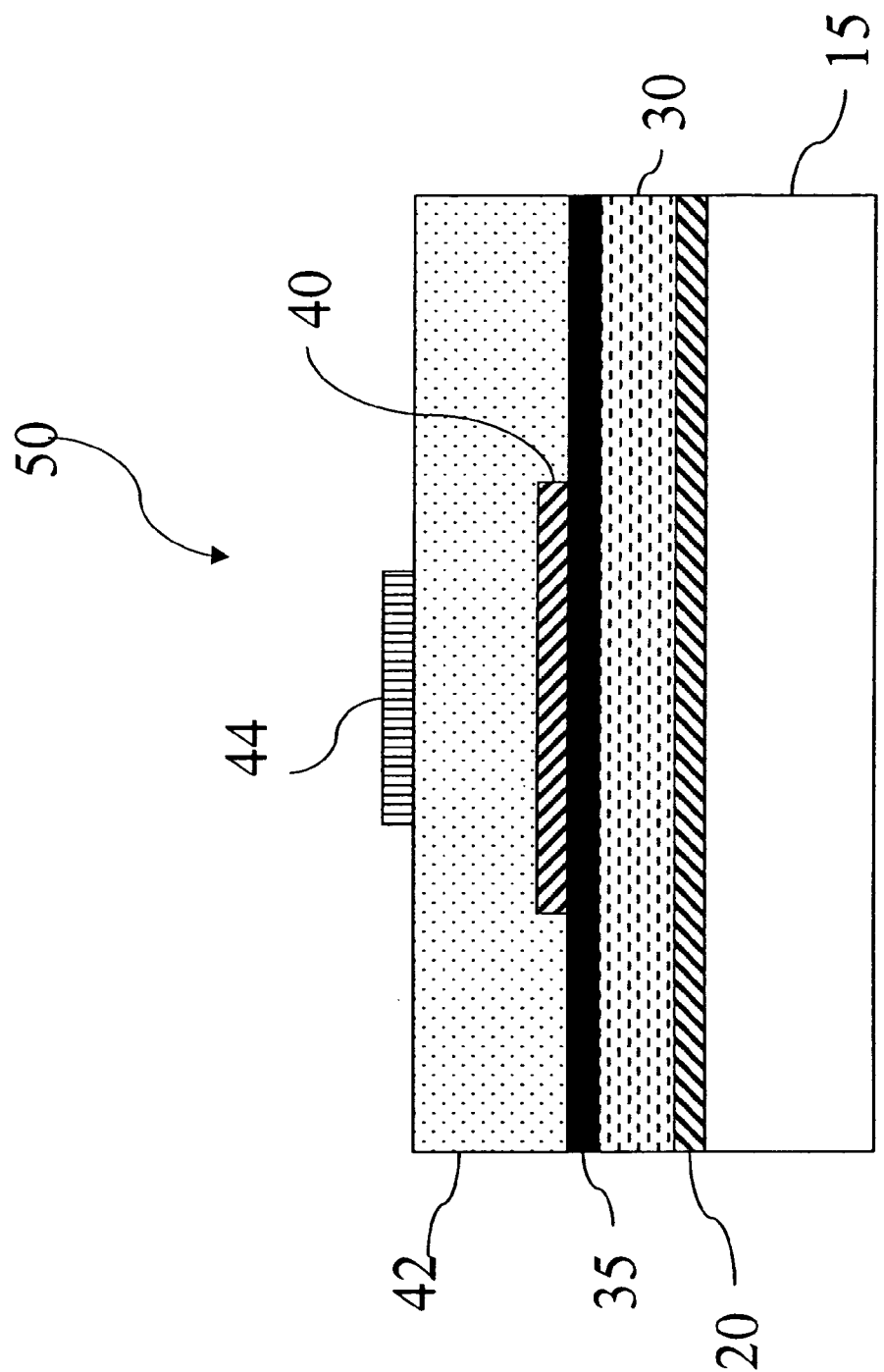
FIG. 2. A schematic of an illustrative polymer dispersed LC display, as per the invention.

As used herein, a "liquid crystal display" (LCD) is a type of flat panel display used in various electronic devices. At a minimum, an LCD comprises a substrate, at least one conductive layer and a liquid crystal layer. LCDs may also comprise two sheets of polarizing material with a liquid crystal solution between the polarizing sheets. The sheets of polarizing material may comprise a substrate of glass or transparent plastic. The LCD may also include functional layers. In one embodiment of an LCD item 50, illustrated in FIG. 2, a transparent, multilayer flexible substrate 15 is coated with a first conductive layer 20, which may be patterned, onto which is coated the light-modulating liquid crystal layer 30. A second conductive layer 40 is applied and overcoated with a dielectric layer 42 to which dielectric conductive row contacts 44 are attached, including vias (not shown) that permit interconnection between conductive layers and the dielectric conductive row contacts. FIG. 2 shows an optional nanopigmented functional layer 35 applied between the liquid crystal layer 30 and the second conductive layer 40. In a typical matrix-address light-emitting display device, numerous light-emitting devices are formed on a single substrate and arranged in groups in a regular grid pattern. Activation may be by rows and columns.

The liquid crystal (LC) is used as an optical switch. The substrates are usually manufactured with transparent, conductive electrodes, in which electrical "driving" signals are coupled. The driving signals induce an electric field which can cause a phase change or state change in the LC material, the LC exhibiting different light-reflecting characteristics according to its phase and/or state.

LC

Liquid crystals can be nematic (N), chiral nematic (N*), or smectic, depending upon the arrangement of the molecules in the mesophase. Chiral nematic liquid crystal (N*LC) displays are typically reflective, that is, no backlight is needed, and can function without the use of polarizing films or a color filter.

Chiral nematic liquid crystal refers to the type of liquid crystal having finer pitch than that of twisted nematic and super-twisted nematic used in commonly encountered LC devices. Chiral nematic liquid crystals are so named because such liquid crystal formulations are commonly obtained by adding chiral agents to host nematic liquid crystals. Chiral nematic liquid crystals may be used to produce bi-stable or multi-stable displays. These devices have significantly reduced power consumption due to their non-volatile "memory" characteristic. Since such displays do not require a continuous driving circuit to maintain an image, they consume significantly reduced power. Chiral nematic displays are bistable in the absence of a field; the two stable textures are the reflective planar texture and the weakly scattering focal conic texture. In the planar texture, the helical axes of the chiral nematic liquid crystal molecules are substantially perpendicular to the substrate upon which the liquid crystal is disposed. In the focal conic state the helical axes of the liquid crystal molecules are generally randomly oriented. Adjusting the concentration of chiral dopants in the chiral nematic material modulates the pitch length of the mesophase and, thus, the wavelength of radiation reflected. Chiral nematic materials that reflect infrared radiation and ultraviolet have been used for purposes of scientific study. Commercial displays are most often fabricated from chiral nematic materials that reflect visible light. Some known LCD devices include chemically-etched, transparent, conductive layers overlying a glass substrate as described in U.S. Pat. No. 5, 667,853.

In one embodiment, a chiral-nematic liquid crystal composition may be dispersed in a continuous matrix. Such materials are referred to as "polymer-dispersed liquid crystal" materials or "PDLC" materials. Such materials can be made by a variety of methods. For example, Doane et al. (Applied Physics Letters, 48, 269 (1986)) disclose a PDLC comprising approximately 0.4 µm droplets of nematic liquid crystal 5CB in a polymer binder. A phase separation method is used for preparing the PDLC. A solution containing monomer and liquid crystal is filled in a display cell and the material is then polymerized. Upon polymerization the liquid crystal becomes immiscible and nucleates to form droplets. West et al. (Applied Physics Letters 63, 1471 (1993)) disclose a PDLC comprising a chiral nematic mixture in a polymer binder. Once again a phase separation method is used for preparing the PDLC. The liquid-crystal material and polymer (a hydroxy functionalized polymethylmethacrylate) along with a cross-linker for the polymer are dissolved in a common organic solvent toluene and coated on a transparent conductive layer on a substrate. A dispersion of the liquid-crystal material in the polymer binder is formed upon evaporation of toluene at high temperature. The phase separation methods of Doane et al. and West et al. require the use of organic solvents that may be objectionable in certain manufacturing environments.

The contrast of the display is degraded if there is more than a substantial monolayer of N*LC domains. The term "substantial monolayer" is defined by the Applicants to mean that, in a direction perpendicular to the plane of the display, there is no more than a single layer of domains sandwiched between the electrodes at most points of the display (or the imaging layer), preferably at 75 percent or more of the points (or area) of the display, most preferably at 90 percent or more of the points (or area) of the display. In other words, at most, only a minor portion (preferably less than 10 percent) of the points (or area) of the display has more than a single domain (two or more domains) between the electrodes in a direction perpendicular to the plane of the display, compared to the amount of points (or area) of the display at which there is only a single domain between the electrodes.

The amount of material needed for a monolayer can be accurately determined by calculation based on individual domain size, assuming a fully closed packed arrangement of domains. (In practice, there may be imperfections in which gaps occur and some unevenness due to overlapping droplets or domains.) On this basis, the calculated amount is preferably less than about 150 percent of the amount needed for monolayer domain coverage, preferably not more than about 125 percent of the amount needed for a monolayer domain coverage, more preferably not more than 110 percent of the amount needed for a monolayer of domains. Furthermore, improved viewing angle and broadband features may be obtained by appropriate choice of differently doped domains based on the geometry of the coated droplet and the Bragg reflection condition.

In a preferred embodiment of the invention, the display device or display sheet has simply a single imaging layer of liquid crystal material along a line perpendicular to the face of the display, preferably a single layer coated on a flexible substrate. Such as structure, as compared to vertically stacked imaging layers each between opposing substrates, is especially advantageous for monochrome shelf labels and the like. Structures having stacked imaging layers, however, are optional for providing additional advantages in some case.

Preferably, the domains are flattened spheres and have on average a thickness substantially less than their length, preferably at least 50% less. More preferably, the domains on average have a thickness (depth) to length ratio of 1:2 to 1:6. The flattening of the domains can be achieved by proper formulation and sufficiently rapid drying of the coating. The domains preferably have an average diameter of 2 to 30 microns. The imaging layer preferably has a thickness of 10 to 150 microns when first coated and 2 to 20 microns when dried.

The flattened domains of liquid crystal material can be defined as having a major axis and a minor axis. In a preferred embodiment of a display or display sheet, the major axis is larger in size than the cell (or imaging layer) thickness for a majority of the domains. Such a dimensional relationship is shown in U.S. Pat. No. 6,061,107.

Nematic Host

Modem chiral nematic liquid crystal materials usually include at least one nematic host combined with a chiral dopant. In general, the nematic liquid crystal phase is composed of one or more mesogenic components combined to provide useful composite properties. Many such materials are available commercially. The nematic component of the chiral nematic liquid crystal may be comprised of any suitable nematic liquid crystal mixture or composition having appropriate liquid crystal characteristics. Nematic liquid crystals suitable for use in the present invention are preferably composed of compounds of low molecular weight selected from nematic or nematogenic substances, for example from the known classes of the azoxybenzenes, benzylideneanilines, biphenyls, terphenyls, phenyl or cyclohexyl benzoates, phenyl or cyclohexyl esters of cyclohexanecarboxylic acid; phenyl or cyclohexyl esters of cyclohexylbenzoic acid; phenyl or cyclohexyl esters of cyclohexylcyclohexanecarboxylic acid; cyclohexylphenyl esters of benzoic acid, of cyclohexanecarboxyiic acid and of cyclohexylcyclohexanecarboxylic acid; phenyl cyclohexanes; cyclohexyibiphenyls; phenyl cyclohexylcyclohexanes; cyclohexylcyclohexanes; cyclohexylcyclohexenes; cyclohexylcyclohexylcyclohexenes; 1,4-bis-cyclohexylbenzenes; 4,4-bis-cyclohexylbiphenyls; phenyl- or cyclohexylpyrimidines; phenyl- or cyclohexylpyridines; phenyl- or cyclohexylpyridazines; phenyl- or cyclohexyidioxanes; phenyl- or cyclohexyl-1,3-dithianes; 1,2-diphenylethanes; 1,2-dicyclohexylethanes; 1-phenyl-2-cyclohexylethanes; 1-cyclohexyl-2-(4-phenylcyclohexyl)ethanes; 1-cyclohexyl-2',2-biphenylethanes; 1-phenyl-2-cyclohexylphenylethanes; optionally halogenated stilbenes; benzyl phenyl ethers; tolanes; substituted cinnamic acids and esters; and further classes of nematic or nematogenic substances. The 1,4-phenylene groups in these compounds may also be laterally mono- or difluorinated. The liquid crystalline material of this preferred embodiment is based on the achiral compounds of this type. The most important compounds, that are possible as components of these liquid crystalline materials, can be characterized by the following formula R'—X—Y-Z-R" wherein X and Z, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, —B-Phe- and —B-Cyc-; wherein Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, and B is 2-(trans-1,4-cyclohexyl)ethyl, pyrimidine-2,5-diyl, pyridine-2,5-diyl or 1,3-dioxane-2,5-diyl. Y in these compounds is selected from the following bivalent groups —CH═CH—, —C≡C—, —N═N(O)—, —CH═CY'—, —CH═N(O)—, —CH2-CH2-, —CO—O—, —CH2-O—, —CO—S—, —CH2-S—, —COO-Phe-COO— or a single bond, with Y' being halogen, preferably chlorine, or —CN; R' and R" are, in each case, independently of one another, alkyl, alkenyl, alkoxy, alkenyloxy, alkanoyloxy, alkoxycarbonyl or alkoxycarbonyloxy with 1 to 18, preferably 1 to 12 C atoms, or alternatively one of R' and R" is —F, —CF3, —OCF3, —Cl, —NCS or —CN. In most of these compounds R' and R' are, in each case, independently of each another, alkyl, alkenyl or alkoxy with different chain length, wherein the sum of C atoms in nematic media generally is between 2 and 9, preferably between 2 and 7. The nematic liquid crystal phases typically consist of 2 to 20, preferably 2 to 15 components. The above list of materials is not intended to be exhaustive or limiting. The lists disclose a variety of representative materials suitable for use or mixtures, which comprise the active element in electro-optic liquid crystal compositions.

Suitable chiral nematic liquid crystal compositions preferably have a positive dielectric anisotropy and include chiral material in an amount effective to form focal conic and twisted planar textures. Chiral nematic liquid crystal materials are preferred because of their excellent reflective characteristics, bi-stability and gray scale memory. The chiral nematic liquid crystal is typically a mixture of nematic liquid crystal and chiral material in an amount sufficient to produce the desired pitch length. Suitable commercial nematic liquid crystals include, for example, E7, E44, E48, E31, E80, BL087, BL101, ZLI-3308, ZLI-3273, ZLI-5048-000, ZLI-5049-100, ZLI-5100-100, ZLI-5800-000, MLC-6041-100.TL202, TL203, TL204 and TL205 manufactured by E. Merck (Darmstadt, Germany). Although nematic liquid crystals having positive dielectric anisotropy, and especially cyanobiphenyls, are preferred, virtually any nematic liquid crystal known in the art, including those having negative dielectric anisotropy should be suitable for use in the invention. Other nematic materials may also be suitable for use in the present invention as would be appreciated by those skilled in the art.

Chiral Dopant

The chiral dopant added to the nematic mixture to induce the helical twisting of the mesophase, thereby allowing reflection of visible light, can be of any useful structural class. The choice of dopant depends upon several characteristics including among others its chemical compatibility with the nematic host, helical twisting power, temperature sensitivity, and light fastness. Many chiral dopant classes are known in the art: e.g., G. Gottarelli and G. Spada, Mol. Cryst. Liq. Crys., 123, 377 (1985); G. Spada and G. Proni, Enantiomer, 3, 301 (1998) and references therein. Typical well-known dopant classes include 1,1-binaphthol derivatives; isosorbide (D-1) and similar isomannide esters as disclosed in U.S. Pat. No. 6,217,792; TADDOL derivatives (D-2) as disclosed in U.S. Pat. No. 6,099,751; and the pending spiroindanes esters (D-3) as disclosed in U.S. patent application Ser. No. 10/651,692 by T. Welter et al., filed Aug. 29, 2003, titled "Chiral Compounds And Compositions Containing The Same."

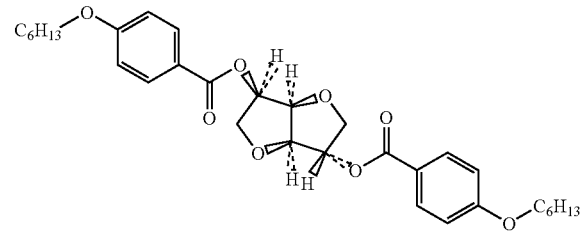

D-1

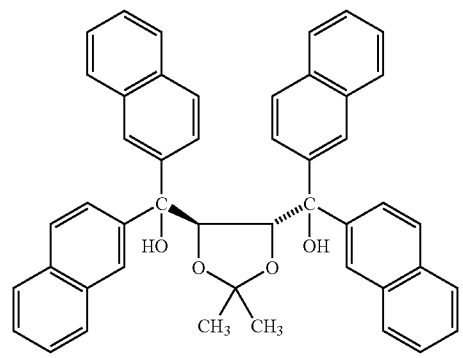

D-2

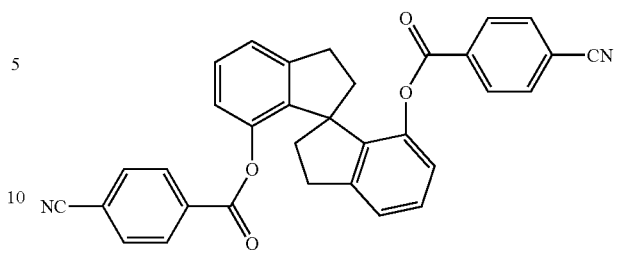

D-3

The pitch length of the liquid crystal materials may be adjusted based upon the following equation (1):

$$\lambda max = n_{av} p0$$

where $\lambda max$ is the peak reflection wavelength, that is, the wavelength at which reflectance is a maximum, $n_{av}$ is the average index of refraction of the liquid crystal material, and $p0$ is the natural pitch length of the chiral nematic helix. Definitions of chiral nematic helix and pitch length and methods of its measurement, are known to those skilled in the art such as can be found in the book, Blinov, L. M., Electro-optical and Magneto-Optical Properties of Liquid Crystals, John Wiley & Sons Ltd. 1983. The pitch length is modified by adjusting the concentration of the chiral material in the liquid crystal material. For most concentrations of chiral dopants, the pitch length induced by the dopant is inversely proportional to the concentration of the dopant. The proportionality constant is given by the following equation (2):

$$p0 = 1/(HTP \cdot c)$$

where c is the concentration of the chiral dopant and HTP (as termed □ in some references) is the proportionality constant.

For some applications, it is desired to have LC mixtures that exhibit a strong helical twist and thereby a short pitch length. For example in liquid crystalline mixtures that are used in selectively reflecting chiral nematic displays, the pitch has to be selected such that the maximum of the wavelength reflected by the chiral nematic helix is in the range of visible light. Other possible applications are polymer films with a chiral liquid crystalline phase for optical elements, such as chiral nematic broadband polarizers, filter arrays, or chiral liquid crystalline retardation films. Among these are active and passive optical elements or color filters and liquid crystal displays, for example STN, TN, AMD-TN, temperature compensation, polymer free or polymer stabilized chiral nematic texture (PFCT, PSCT) displays. Possible display industry applications include ultralight, flexible, and inexpensive displays for notebook and desktop computers, instrument panels, video game machines, videophones, mobile phones, hand-held PCs, PDAs, e-books, camcorders, satellite navigation systems, store and supermarket pricing systems, highway signs, informational displays, smart cards, toys, and other electronic devices.

There are alternative display technologies to LCDs that may be used, for example, in flat panel displays. A notable example is organic or polymer light emitting devices (OLEDs) or (PLEDs), which are comprised of several layers in which one of the layers is comprised of an organic material that can be made to electroluminesce by applying a voltage across the device. An OLED device is typically a laminate formed in a substrate such as glass or a plastic polymer. Alternatively, a plurality of these OLED devices may be assembled such to form a solid state lighting display device.

A light emitting layer of a luminescent organic solid, as well as adjacent semiconductor layers, are sandwiched between an anode and a cathode. The semiconductor layers may be hole injecting and electron injecting layers. PLEDs may be considered a subspecies of OLEDs in which the luminescent organic material is a polymer. The light emitting layers may be selected from any of a multitude of light emitting organic solids, e.g., polymers that are suitably fluorescent or chemiluminescent organic compounds. Such compounds and polymers include metal ion salts of 8-hydroxyquinolate, trivalent metal quinolate complexes, trivalent metal bridged quinolate complexes, Schiff-based divalent metal complexes, tin (IV) metal complexes, metal acetylacetonate complexes, metal bidenate ligand complexes incorporating organic ligands, such as 2-picolylketones, 2-quinaldylketones, or 2-(o-phenoxy)pyridine ketones, bis-phosphonates, divalent metal maleonitriledithiolate complexes, molecular charge transfer complexes, rare earth mixed chelates, (5-hydroxy)quinoxaline metal complexes, aluminum tris-quinolates, and polymers such as poly(p-phenylenevinylene), poly(dialkoxyphenylenevinylene), poly(thiophene), poly(fluorene), poly(phenylene), poly(phenylacetylene), poly(aniline), poly(3-alkylthiophene), poly(3-octylthiophene), and poly(N-vinylcarbazole). When a potential difference is applied across the cathode and anode, electrons from the electron injecting layer and holes from the hole injecting layer are injected into the light emitting layer; they recombine, emitting light. OLEDs and PLEDs are described in the following United States patents: U.S. Pat. No. 5,707,745 to Forrest et al., U.S. Pat. No. 5,721, 160 to Forrest et al., U.S. Pat. No. 5,757,026 to Forrest et al., U.S. Pat. No. 5,834,893 to Bulovic et al., U.S. Pat. No. 5,861,219 to Thompson et al., U.S. Pat. No. 5,904,916 to Tang et al., U.S. Pat. No. 5,986,401 to Thompson et al., U.S. Pat. No. 5,998, 803 to Forrest et al., U.S. Pat. No. 6,013,538 to Burrows et al., U.S. Pat. No. 6,046,543 to Bulovic et al., U.S. Pat. No. 6,048, 573 to Tang et al., U.S. Pat. No. 6,048,630 to Burrows et al., U.S. Pat. No. 6,066,357 to Tang et al., U.S. Pat. No. 6,125,226 to Forrest et al., U.S. Pat. No. 6,137,223 to Hung et al., U.S. Pat. No. 6,242,115 to Thompson et al., and U.S. Pat. No. 6,274,980 to Burrows et al.

In a typical matrix address light emitting display device, numerous light emitting devices are formed on a single substrate and arranged in groups in a regular grid pattern. Activation may be by rows and columns, or in an active matrix with individual cathode and anode paths. OLEDs are often manufactured by first depositing a transparent electrode on the substrate, and patterning the same into electrode portions. The organic layer(s) is then deposited over the transparent electrode. A metallic electrode may be formed over the organic layers. For example, in U.S. Pat. No. 5,703, 436 to Forrest et al., transparent indium tin oxide (ITO) is used as the hole injecting electrode, and a Mg—Ag—ITO electrode layer is used for electron injection.

The present invention can be employed in most OLED device configurations as an electrode, preferably as an anode. These include very simple structures comprising a single anode and cathode to more complex devices, such as passive matrix displays comprised of orthogonal arrays of anodes and cathodes to form pixels, and active-matrix displays where each pixel is controlled independently, for example, with thin film transistors (TFTs).

Figure 3:
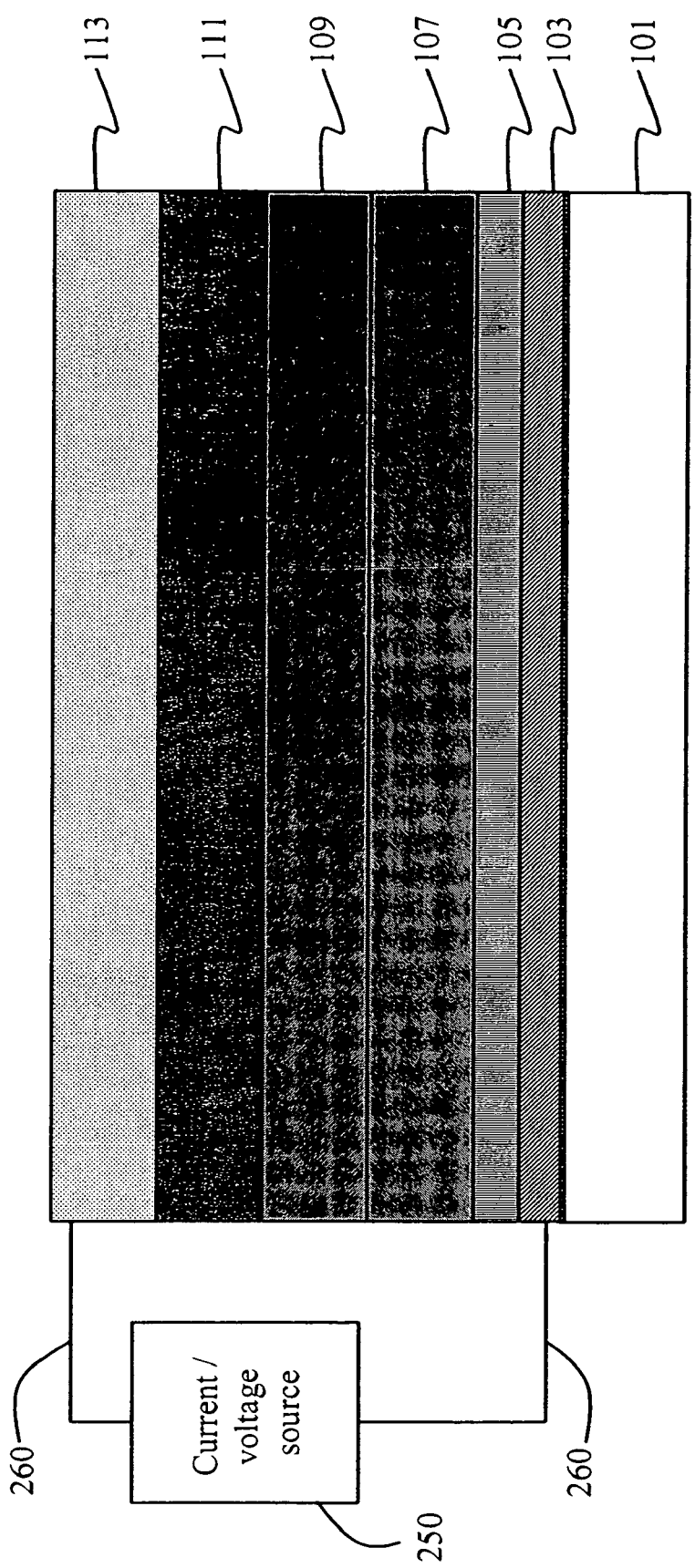
FIG. 3. A schematic of an OLED based display, as per the investion.

There are numerous configurations of the organic layers wherein the present invention can be successfully practiced. A typical structure is shown in FIG. 3 and is comprised of a substrate 101, an anode 103, a hole-injecting layer 105, a hole-transporting layer 107, a light-emitting layer 109, an electron-transporting layer 111, and a cathode 113. These layers are described in more detail below. Note that the substrate may alternatively be located adjacent to the cathode, or the substrate may actually constitute the anode or cathode. The organic layers between the anode and cathode are conveniently referred to as the organic electroluminescent (EL) element. The total combined thickness of the organic layers is preferably less than 500 nm.

The anode and cathode of the OLED are connected to a voltage/current source 250 through electrical conductors 260. The OLED is operated by applying a potential between the anode and cathode such that the anode is at a more positive potential than the cathode. Holes are injected into the organic EL element from the anode and electrons are injected into the organic EL element at the anode. Enhanced device stability can sometimes be achieved when the OLED is operated in an AC mode where, for some time period in the cycle, the potential bias is reversed and no current flows. An example of an AC driven OLED is described in U.S. Pat. No. 5,552,678.

When EL emission is viewed through anode 103, the anode should be transparent or substantially transparent to the emission of interest. Thus, the FOM of this invention is critical for such OLED display devices. Common transparent anode materials used in this invention are indium-tin oxide (ITO), indium-zinc oxide (IZO) and tin oxide, but other metal oxides can work including, but not limited to, aluminum- or indium-doped zinc oxide, magnesium-indium oxide, and nickel-tungsten oxide. In addition to these oxides, metal nitrides, such as gallium nitride, and metal selenides, such as zinc selenide, and metal sulfides, such as zinc sulfide, can be used as the anode. For applications where EL emission is viewed only through the cathode electrode, the transmissive characteristics of anode are generally immaterial and any conductive material can be used, transparent, opaque or reflective. Example conductors for this application include, but are not limited to, gold, iridium, molybdenum, palladium, and platinum. Typical anode materials, transmissive or otherwise, have a work function of 4.1 eV or greater. Desired anode materials are commonly deposited by any suitable means such as evaporation, sputtering, chemical vapor deposition, or electrochemical means. Anodes can be patterned using well-known photolithographic processes. Optionally, anodes may be polished prior to application of other layers to reduce surface roughness so as to minimize shorts or enhance reflectivity.

The electrically imageable material may also be a printable, conductive ink having an arrangement of particles or microscopic containers or microcapsules. Each microcapsule contains an electrophoretic composition of a fluid, such as a dielectric or emulsion fluid, and a suspension of colored or charged particles or colloidal material. The diameter of the microcapsules typically ranges from about 30 to about 300 microns. According to one practice, the particles visually contrast with the dielectric fluid. According to another example, the electrically modulated material may include rotatable balls that can rotate to expose a different colored surface area, and which can migrate between a forward viewing position and/or a rear nonviewing position, such as gyricon. Specifically, gyricon is a material comprised of twisting rotating elements contained in liquid filled spherical cavities and embedded in an elastomer medium. The rotating elements may be made to exhibit changes in optical properties by the imposition of an external electric field. Upon application of an electric field of a given polarity, one segment of a rotating element rotates toward, and is visible by an observer of the display. Application of an electric field of opposite polarity, causes the element to rotate and expose a second, different segment to the observer. A gyricon display maintains a given configuration until an electric field is actively applied to the display assembly. Gyricon particles typically have a diameter of about 100 microns. Gyricon materials are disclosed in U.S. Pat. No. 6,147,791, U.S. Pat. No. 4,126, 854 and U.S. Pat. No. 6,055,091.

According to one practice, the microcapsules may be filled with electrically charged white particles in a black or colored dye. Examples of electrically modulated material and methods of fabricating assemblies capable of controlling or effecting the orientation of the ink suitable for use with the present invention are set forth in International Patent Application Publication Number WO 98/41899, International Patent Application Publication Number WO 98/19208, International Patent Application Publication Number WO 98/03896, and International Patent Application Publication Number WO 98/41898.

The electrically imageable material may also include material disclosed in U.S. Pat. No. 6,025,896. This material comprises charged particles in a liquid dispersion medium encapsulated in a large number of microcapsules. The charged particles can have different types of color and charge polarity. For example white positively charged particles can be employed along with black negatively charged particles. The described microcapsules are disposed between a pair of electrodes, such that a desired image is formed and displayed by the material by varying the dispersion state of the charged particles. The dispersion state of the charged particles is varied through a controlled electric field applied to the electrically modulated material. According to a preferred embodiment, the particle diameters of the microcapsules are between about 5 microns and about 200 microns, and the particle diameters of the charged particles are between about one-thousandth and one-fifth the size of the particle diameters of the microcapsules.

Further, the electrically imageable material may include a thermochromic material. A thermochromic material is capable of changing its state alternately between transparent and opaque upon the application of heat. In this manner, a thermochromic imaging material develops images through the application of heat at specific pixel locations in order to form an image. The thermochromic imaging material retains a particular image until heat is again applied to the material. Since the rewritable material is transparent, UV fluorescent printings, designs and patterns underneath can be seen through.

The electrically imageable material may also include surface stabilized ferrroelectric liquid crystals (SSFLC). Surface stabilized ferroelectric liquid crystals confining ferroelectric liquid crystal material between closely spaced glass plates to suppress the natural helix configuration of the crystals. The cells switch rapidly between two optically distinct, stable states simply by alternating the sign of an applied electric field.

Magnetic particles suspended in an emulsion comprise an additional imaging material suitable for use with the present invention. Application of a magnetic force alters pixels formed with the magnetic particles in order to create, update or change human and/or machine readable indicia. Those skilled in the art will recognize that a variety of bistable nonvolatile imaging materials are available and may be implemented in the present invention.

The electrically imageable material may also be configured as a single color, such as black, white or clear, and may be fluorescent, iridescent, bioluminescent, incandescent, ultraviolet, infrared, or may include a wavelength specific radiation absorbing or emitting material. There may be multiple layers of electrically imageable material. Different layers or regions of the electrically imageable material display material may have different properties or colors. Moreover, the characteristics of the various layers may be different from each other. For example, one layer can be used to view or display information in the visible light range, while a second layer responds to or emits ultraviolet light. The nonvisible layers may alternatively be constructed of non-electrically modulated material based materials that have the previously listed radiation absorbing or emitting characteristics. The electrically imageable material employed in connection with the present invention preferably has the characteristic that it does not require power to maintain display of indicia.

Another application of the invention is envisioned for touch screens. Touch screens are widely used in conventional CRTs and in flat-panel display devices in computers and in particular with portable computers. The present invention can be applied as a transparent conductive member in any of the touch screens known in the art, including but not limited to those disclosed in U.S. patent application Pub. 2003/0170456 A1; 2003/0170492 A1; U.S. Pat. No.5,738,934; and WO 00/39835.

Figure 4:
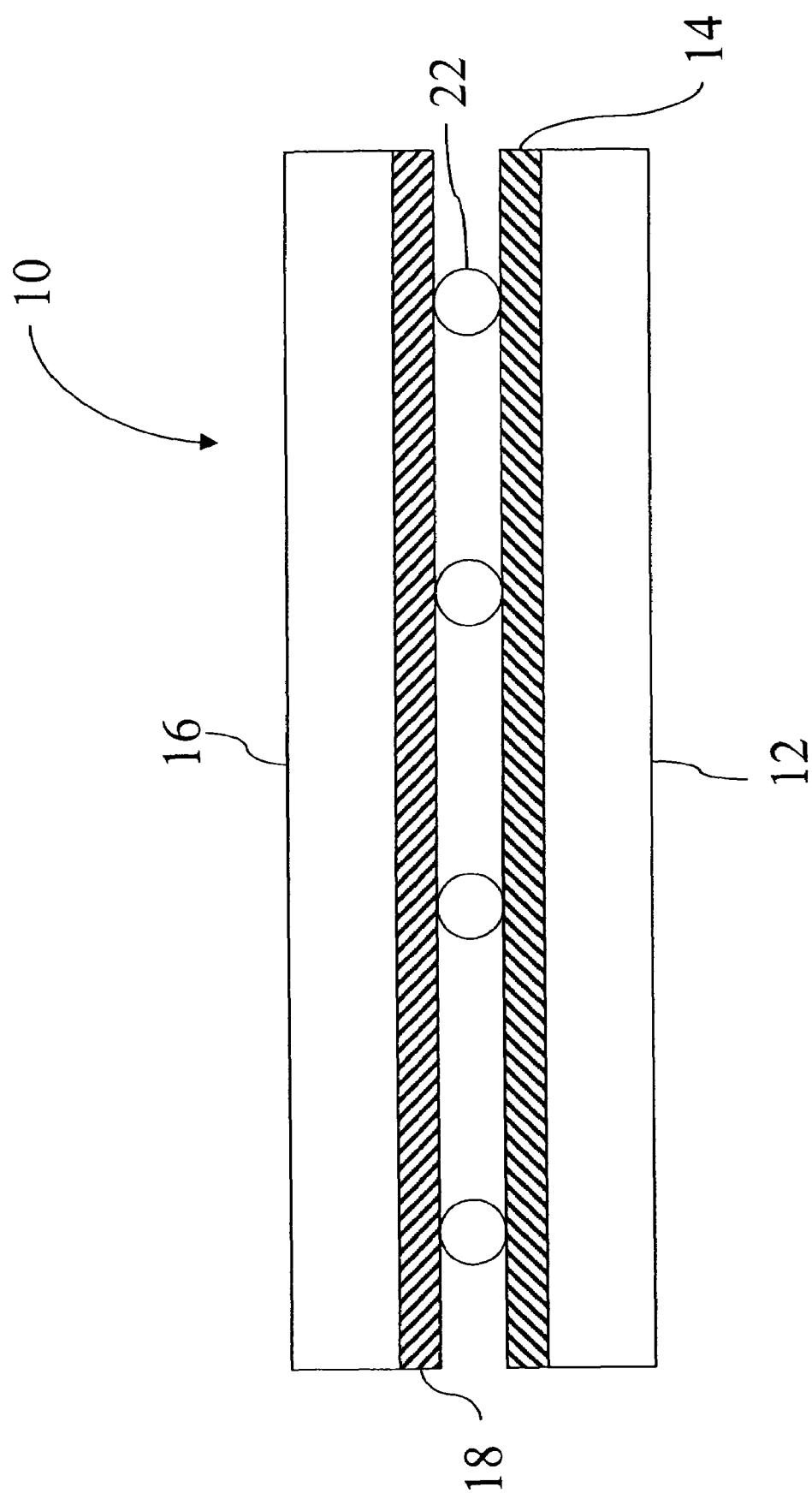
FIG. 4. A schematic of an illustrative resistive-type touch screen, as per the invention.

FIG. 4 shows a multilayered item 10 for a typical prior art resistive-type touch screen including a transparent substrate 12, having a first conductive layer 14. A flexible transparent cover sheet 16 includes a second conductive layer 18 that is physically separated from the first conductive layer 14 by spacer elements 22. A voltage is developed across the conductive layers. The conductive layers 14 and 18 have a resistance selected to optimize power usage and position sensing accuracy. Deformation of the flexible cover sheet 16 by an external object such as a finger or stylus causes the second conductive layer 18 to make electrical contact with first conductive layer 14, thereby transferring a voltage between the conductive layers. The magnitude of this voltage is measured through connectors (not shown) connected to metal conductive patterns (not shown) formed on the edges of conductive layers 18 and 14 to locate the position of the deforming object.

The conventional construction of a resistive touch screen involves the sequential placement of materials upon the substrate. The substrate 12 and cover sheet 16 are first cleaned, then uniform conductive layers are applied to the substrate and cover sheet. It is known to use a coatable electronically conductive polymer such as polythiophene or polyaniline to provide the flexible conductive layers. See for example WO 00/39835, which shows a light transmissive substrate having a light transmissive conductive polymer coating, and U.S. Pat. No. 5,738,934 which shows a cover sheet having a conductive polymer coating. The spacer elements 22 are then applied and, finally, the flexible cover sheet 16 is attached.

Testing

A commercially available grade of polythiophene in a cationic form with a polyanion compound is supplied by H.C. Stark as Baytron P HC, which is an aqueous dispersion of poly(3,4-ethylene dioxythiophene styrene sulfonate). Coatings of Baytron P HC, with conductivity enhancing agents, were formed at various coverages on 100 µm thick PET films with adhesion promoting subbing layers.

The SER of these coatings were measured by a 4-point electrical probe. The visual light transmission T of these coatings were determined from the total optical density, measured by a Model 361T X-Rite densitometer, after correcting for the contribution of the uncoated substrate.

(a) % T vs. SER

Figure 5:
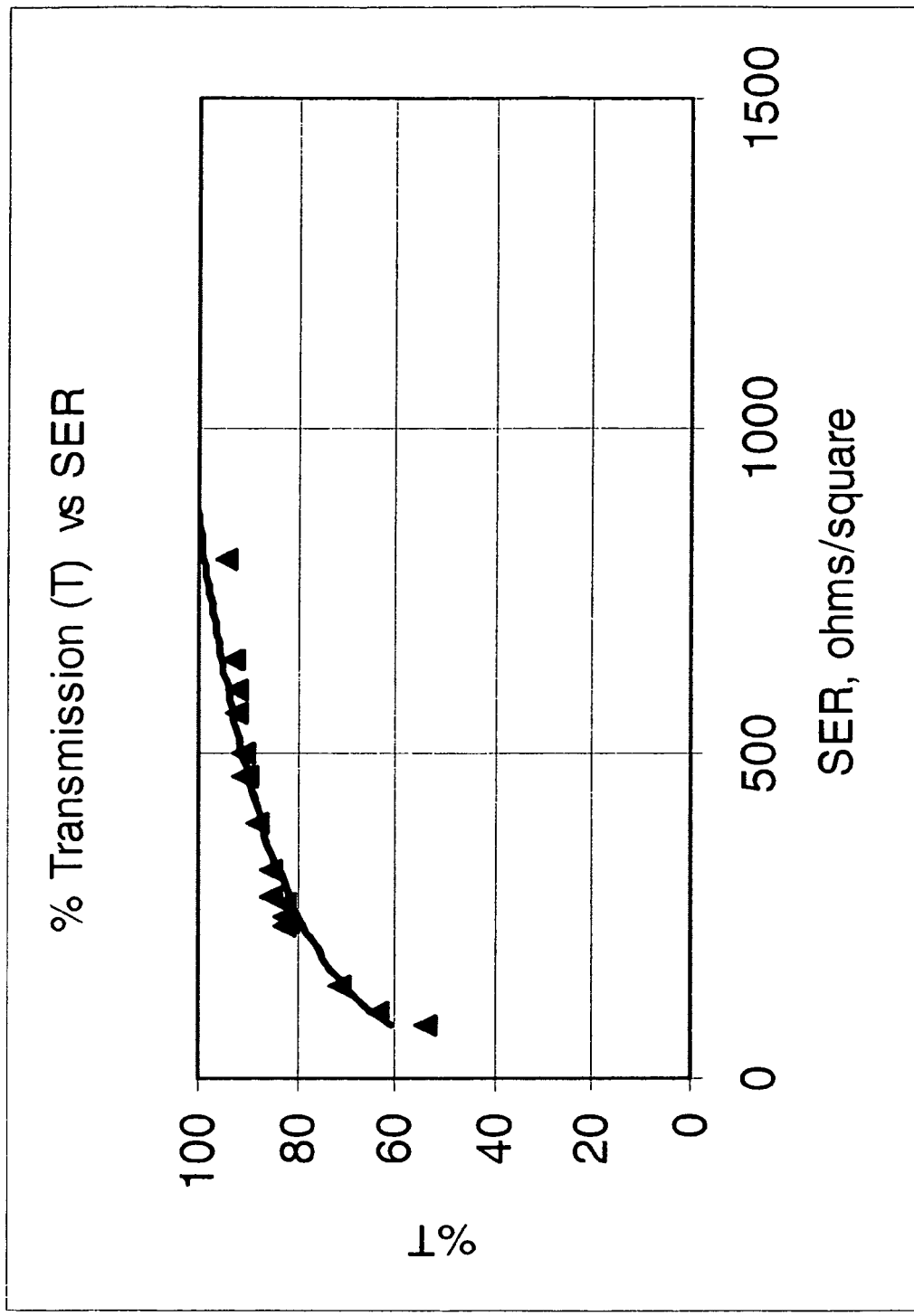
FIG. 5. A plot of % Transmission (T) and SER for Baytron P HC coatings as per invention.

The % T for the Baytron P HC coatings are plotted as a function of the SER, in FIG. 5.

(b) FOM

Figure 6:
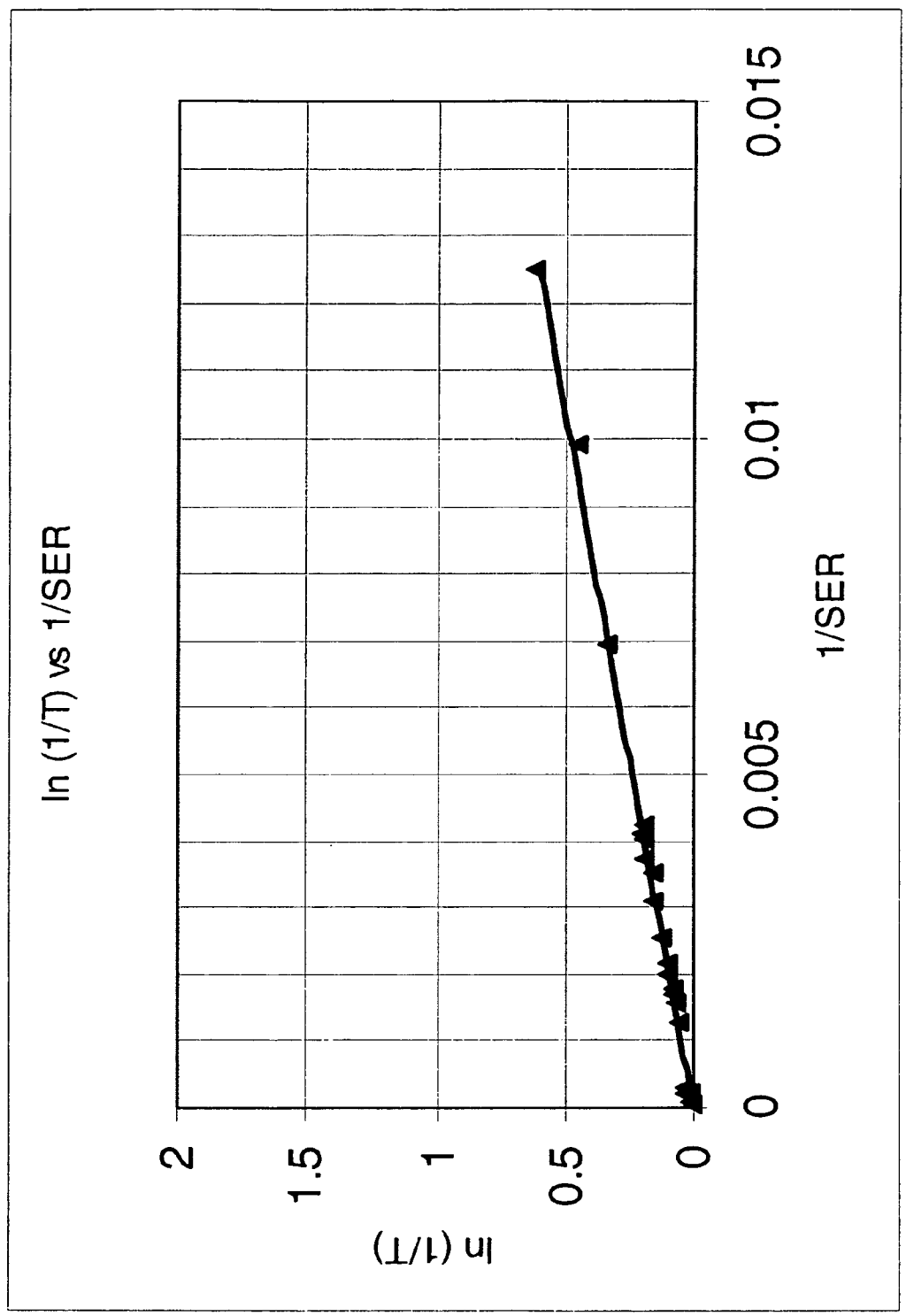
FIG. 6. A plot of ln(1/T) vs. 1/SER for Baytron P HC coatings as per invention.

Plot of ln (1/T) vs. 1/SER for the aforementioned coatings of Baytron P HC is shown in FIG. 6. Clearly, for the above grade of electronically conductive polymer, the data fall on a straight line passing through the origin. As defined hereinabove, the slope of the straight line is the FOM of the coatings. Accordingly, the FOM of the Baytron P HC coatings is determined to be 48.4.

EXAMPLES

The present invention is further illustrated by the following examples of its practice. Coating compositions were prepared by mixing:

Baytron P HC dispersion;
lin 10G, a nonionic surfactant supplied by Olin Chemicals;
N-methylpyrrolidone, a conductivity enhancing agent;
diethylene glycol, another conductivity enhancing agent;
isopropanol; and optionally Sancure 898, a film-forming polyurethane dispersion supplied by Noveon.

Details of coating compositions A and B are provided below.

| Coating composition A | |
|---|---|
| Olin 10G (10% aqueous) | 0.5 g |
| Baytron P HC (1.3% aqueous) | 88.71 g |
| Sancure 898 (1.3% aqueous) | 0 g |
| Diethylene glycol | 4 g |
| N-methylpyrrolidone | 5.16 g |
| Isopropanol | 6.13 g |
| Coating composition B | |
| Olin 10G (10% aqueous) | 0.5 g |
| Baytron P HC (1.3% aqueous) | 70.97 g |
| Sancure 898 (1.3% aqueous) | 17.74 g |
| Diethylene glycol | 4 g |
| N-methylpyrrolidone | 5.16 g |
| Isopropanol | 6.13 g |

A number of coatings, Examples 1 through 4, were prepared from coating compositions A and B, at various wet coverages on 100 μm thick PET films, with an adhesion promoting subbing layer (on the subbing side), as per the invention. The said subbing layer comprised a vinylidene chloride-acrylonitrile-acrylic acid terpolymer latex. The details of the coatings and their characteristics are listed in Table 1 below.

TABLE 1

| Sample | Coating composition | Wet coverage cc/meter$^2$ | Baytron P HC/Sancure weight ratio | FOM | SER ohms/square | % T |
|---|---|---|---|---|---|---|
| Example 1 | A | 16.15 | 100/0 | 48.4 | 467 | 91 |
| Example 2 | A | 32.29 | 100/0 | 48.4 | 242 | 82 |
| Example 3 | B | 16.15 | 80/20 | 48.4 | 646 | 93 |
| Example 4 | B | 32.29 | 80/20 | 48.4 | 324 | 85 |

It is amply clear that the examples of the invention, with an FOM of less than 50, generated SER less than 1000 ohms/square and % T of greater than 80. In fact, with Example 3, it was demonstrated that an SER as low as 242 ohms/square could be obtained with % T of greater than 80, as per the invention. These examples illustrate the desirability of the conductive layers of the invention for application in display devices.

Comparative Examples

The FOM for a number of comparative samples representing state of the art are listed below in Table. 2. The FOM values were determined either from actual measurement of T and SER or from the published data for the lowest SER. For ease of comparison, similar data from Baytron P HC coatings, as per invention are also included in Table 2. It is clear that the FOM values of the electronically conductive polymer layers of the art, even including a very recent research report by Martin et al. in Synthetic Metals, vol. 142 (2004), p. 187-193, are higher than that of the examples of the invention. Also included in Table 2 are the calculated % T values corresponding to each FOM, for an SER of 250 ohms/square. Further included in Table 2 are the calculated SER values corresponding to each FOM, for T of 95%.

The results presented in Table 2 clearly indicate the criticality of the FOM value and show that electrically conductive coatings of the prior art that have FOM values outside the range of the present invention are able to provide either highly conductive layers having poor transparency or transparent layers having poor conductivity. Only coatings of the present invention having FOM<50 are able to simultaneously provide layers that have both excellent transparency and conductivity. Hence, the coatings of the present invention uniquely satisfy the demanding requirements of electrodes for use in current and future display device applications.

TABLE 2

| Description | FOM | Calculated T in % for SER = 250 Ω/□ | Calculated SER in Ω/□ for T = 95% |
|---|---|---|---|
| PEDOT/PSS with inorganic sol, as per U.S. Pat. No. 6,235,827 | 111.8 | 63.9 | 2180 |
| Orgacon, Afga Specialty Films Technical Literature and as per U.S. Pat. No. 6,737,293 | 103.6 | 66.1 | 2020 |
| PEDOT/PSS with hydroxylated secondary dopant; Martin et al. in Synthetic Metals, vol.142 (2004), p.187-193 | 61 | 78.3 | 1189 |
| Baytron P HC coatings, as per invention | 48.4 | 82.4 | 944 |

The invention has been described in detail with particular reference to certain preferred embodiments thereof, but it will be understood that variations and modifications can be effected within the spirit and scope of the invention.

PARTS LIST 10 item for resistive-type touchscreen
12 transparent substrate
14 first conductive layer
15 flexible substrate
16 transparent cover sheet
18 second conductive layer
20 first conductive layer
22 spacer element
30 light-modulating liquid crystal layer 35 nanopigmented functional layer
40 second conductive layer
42 dielectric layer
44 conductive row contacts
50 LCD item
60 display component
62 substrate
64 electronically conductive polymer layer
66 power source
68 electric lead
101 substrate
103 anode
105 hole-injecting layer
107 hole-transporting layer
109 light-emitting layer
111 electron-transporting layer
113 cathode
250 voltage/current source
260 electrical conductors

The invention claimed is:

1. A member comprising a substrate and a transparent conductive layer comprising a composition including an electronically conductive polythiophene polymer present in a cationic form with a polyanion, wherein the composition of said conductive layer has an FOM less than or equal to 50 wherein FOM is defined as the slope of a best fit straight line passing through the origin of the plot of ln (1/T) versus for said composition; and wherein T=visual light transmission
SER=surface electrical resistance in ohm per square
FOM=Figure of merit, and wherein the SER of the conductive layer has a value of less than or equal to 1000 ohm per square.

2. The member of claim 1 wherein said conductive layer further comprises a surfactant.

3. The member of claim 1 wherein the polythiophene and polyanion are in a weight ratio of between 85:15 and 15:85.

4. The member of claim 1 wherein said conductive layer has a visual light transmission of greater than 90%.

5. The member of claim 1 wherein said conductive layer has a visual light transmission of greater than 80%.

6. The member of claim 1 wherein said conductive layer is coated utilizing a conductivity enhancing agent.

7. The member of claim 1 wherein said member is flexible.

8. The member of claim 1 wherein said transparent conductive layer has a surface roughness of <20 nm Ra.

9. The member of claim 1 wherein the figure of merit is less than or equal to 40.

10. The member of claim 1 wherein said substrate comprises at least one material selected from the group consisting of polyethyleneterephthalate, polyethylenenaphthalate, polycarbonate, glass, and cellulose acetate.

11. A display device, comprising a substrate, a conductive layer on a surface of said substrate, and a lead electrically connected to said conductive layer, wherein said conductive layer comprises a composition including an electronically conductive polythiophene polymer present in a cationic form with a polyanion, wherein the composition of said conductive layer has an FOM less than or equal to 50 wherein FOM is defined as the slope of a best fit straight line passing through the origin of the plot of ln (1/T) versus for said composition: and wherein
T=visual light transmission
SER=surface electrical resistance in ohm per square
FOM=figure of merit, and wherein the SER of the conductive layer has a value of less than or equal to 1000 ohm per square.

12. The device of claim 11 further comprising a current source electrically connected to said conducting polymer.

13. The device of claim 11, wherein a liquid crystalline material is in contact with said conducting polymer either directly or through a dielectric passivating layer.

14. The device of claim 11, further comprising a voltage source electrically connected to said conducting polymer.

15. The device of claim 11, wherein said conducting polymer forms a pattern on the surface of the substrate.

16. The device of claim 11, wherein said substrate is selected from the group consisting of polyethyleneterephthalate, polyethylenenaphthalate, polycarbonate, glass, and cellulose acetate.

17. The device of claim 11, wherein said substrate is flexible.

18. The display device of claim 11 further comprising at least one electrically imageable layer.

19. The display device of claim 18 wherein said electrically imageable material comprises light modulating material.

20. The display device of claim 19 wherein said light modulating material comprises at least one member selected from the group consisting of electrochemical, electrophoretic, electrochromic and liquid crystals.

21. The display device of claim 19 wherein said light modulating material is reflective or transmissive.

22. The display device of claim 18 wherein said electrically imageable layer comprises light emitting material.

23. The display device of claim 22 wherein said light emitting material comprises organic light emitting diodes or polymeric light emitting diodes.

24. A method of providing a conductive layer comprising providing a receiver substrate, providing a donor member comprising a substrate and a transparent conductive layer comprising a composition including an electronically conductive polythiophene polymer present in a cationic form with a polyanion, wherein the composition of said conductive layer has an FOM less than or equal to 50 wherein FOM is defined as the slope of a best fit straight line passing through the origin in of the plot of ln (LIT) versus for said composition: and wherein
T=visual light transmission
SER=surface electrical resistance in ohm per square
FOM=figure of merit, and wherein the SER of the conductive layer has a value of less than or equal to 1000 ohm per square, bringing said receiver substrate into contact with said donor member, and transferring said transparent conductive layer from said donor member.

25. The method of claim 24 wherein heat is applied during transferring.

26. The method of claim 24 wherein pressure is applied during transferring.

27. The method of claim 24 wherein heat and pressure are applied during transfer.

28. The method of claim 24 wherein said receiver substrate comprises an adhesive.

29. The method of claim 24 wherein transferring utilizes an adhesive between said conductive layer and said receiver layer.

* * * * *

UNITED STATES PATENT AND TRADEMARK OFFICE
CERTIFICATE OF CORRECTION

PATENT NO. : 7,427,441 B2  
APPLICATION NO. : 10/944570  
DATED : September 23, 2008  
INVENTOR(S) : Debasis Majumdar et al.

It is certified that error appears in the above-identified patent and that said Letters Patent is hereby corrected as shown below:

| | |
|---|---|
| Col. 25, line 30, | In Claim 1, after "versus" insert -- [1/SER] --. |
| Col. 25, line 66, | In Claim 11, after "versus" insert -- [1/SER] --. |
| Col. 26, line 25, | In Claim 19, delete "material" and insert -- layer --, therefor. |
| Col. 26, line 45, | In Claim 24, after "origin" delete "in". |
| Col. 26, line 45, | In Claim 24, delete "(LIT)" and insert -- (1/T) --, therefor. |
| Col. 26, line 45, | In Claim 24, after "versus" insert -- [1/SER] --. |

Signed and Sealed this

Thirty-first Day of August, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,427,441 B2 | Page 1 of 1 |
| APPLICATION NO. | : 10/944570 | |
| DATED | : September 23, 2008 | |
| INVENTOR(S) | : Debasis Majumdar et al. | |

It is certified that error appears in the above-identified patent and that said Letters Patent is hereby corrected as shown below:

Title page, insert    --Item (73) Assignee EASTMAN KODAK COMPANY, Rochester, NY (US)--

Signed and Sealed this

Twenty-fifth Day of January, 2011

David J. Kappos
*Director of the United States Patent and Trademark Office*